United States Patent
Hirokane et al.

Patent Number: 5,985,436
Date of Patent: Nov. 16, 1999

[54] MAGNETO-OPTICAL RECORDING MEDIUM, MAGNETO-OPTICAL RECORDING METHOD, AND MAGNETO-OPTICAL RECORDING APPARATUS

[75] Inventors: Junji Hirokane, Nara; Yoshiteru Murakami, Nishinomiya; Akira Takahashi, Nara, all of Japan

[73] Assignee: Sharp Kabushiki Kaisha, Osaka, Japan

[21] Appl. No.: 08/935,395

[22] Filed: Sep. 23, 1997

[30] Foreign Application Priority Data

Sep. 26, 1996 [JP] Japan ................... 8-254200

[51] Int. Cl.$^6$ ........................... G11B 5/66
[52] U.S. Cl. ............ 428/332; 428/336; 428/694 ML; 428/694 SC; 428/694 MM; 428/694 MT; 428/694 RE; 428/900; 369/13
[58] Field of Search ............ 428/694 ML, 694 SC, 428/694 MM, 694 MT, 694 RE, 900, 336, 332; 369/13

[56] References Cited

U.S. PATENT DOCUMENTS

| | | | |
|---|---|---|---|
| 5,623,458 | 4/1997 | Matsumoto et al. | 369/13 |
| 5,648,162 | 7/1997 | Hirokane | 428/332 |
| 5,691,963 | 11/1997 | Hirokane | 369/13 |

FOREIGN PATENT DOCUMENTS

| | | |
|---|---|---|
| 596 716 A2 | 5/1994 | European Pat. Off. . |
| 5-205 333 | 8/1993 | Japan . |
| 7-244 877 | 9/1995 | Japan . |

OTHER PUBLICATIONS

S. Ohnuki, et al., Magnetic Capping Layer Effect Of Very Thin Cobalt Film on TbFeCo, Magneto–Optical Recording International Symposium, 1994, Digests of papers at Moris 1994, Sep. 27–29, 1994, Tokyo, Japan, 28–F–03, p. 32.

K. Aratani, et al., Coaxing the Maximum Performance Out of an Ordinary MO Disk, International Symposium on Optical Memory, 1995, Aug. 30–Sep. 1, 1995, Kanazawa City Cultural Hall, Kanazawa, Ishikawa, Japan, Fr–D5, pp. 169–170.

Tamanoi K, et al. "Magnetically–induced super resolution using magneto–static coupling" Proceefings of Moris '94; Journal of the Magnetic Society of Japan, vol. 19, No. Supple. S1 27–29 Sep. 1994, Tokyo;JP, pp. 421–424.

Database WPI, Section Ch, Week 9337, Derwent Publications Ltd., London, GB; Class L03, AN 93–290917 XP 002 064 974.

*Primary Examiner*—Leszek Kiliman
*Attorney, Agent, or Firm*—David G. Conlin; William J. Daley, Jr.

[57] ABSTRACT

A magneto-optical recording medium including at least a recording layer, and an auxiliary recording layer which achieves magnetostatic coupling with the recording layer. The auxiliary recording layer is in an in-plane magnetization state at temperatures lower than a recording temperature, and in a perpendicular magnetization state at temperatures not lower than the recording temperature. It is therefore possible to achieve a decrease in a recording magnetic field.

21 Claims, 15 Drawing Sheets

MAGNETO-OPTICAL RECORDING MEDIUM, MAGNETO-OPTICAL RECORDING METHOD, AND MAGNETO-OPTICAL RECORDING APPARATUS

FIELD OF THE INVENTION

The present invention relates to magneto-optical recording media such as magneto-optical disks, magneto-optical tapes and magneto-optical cards on which information is magneto-optically recorded, and also relates to a recording method and a magneto-optical recording apparatus for recording information on such magneto-optical recording media.

BACKGROUND OF THE INVENTION

Magneto-optical recording media have been in practical use as rewritable optical recording media. Information is recorded on such a magneto-optical recording medium by converging semiconductor laser light on the magneto-optical recording medium and aligning the magnetization direction in a portion showing a rise in temperature with the direction of an external recording magnetic field applied. On the other hand, information is read out from the recording medium by converging the same semiconductor laser light on the recording medium after decreasing the power of the semiconductor laser light and detecting the polarized state of reflected light.

In order to decrease a recording magnetic field required for recording, a magneto-optical recording medium including a recording layer made of TbFeCo and a magnetic layer made of Co which achieve exchange coupling with each other was proposed in the Magneto-optical Recording International Symposium 1994 (28-F-03). Moreover, a magneto-optical recording medium including a recording layer made of TbFeCo and a magnetic layer made of GdFeCo which achieve exchange coupling with each other was proposed in the International Symposium on Optical Memory 1995 (Fr-D5). In these magneto-optical recording media, a magnetic layer is exchange-coupled with a recording layer. It is therefore possible to reverse the magnetization of the recording layer exchange-coupled with the magnetic layer by reversing the magnetization of the magnetic layer in recording. If a material whose magnetization is reversed at a lower magnetic field strength than that for the recording layer is used for the magnetic layer like the above-mentioned examples, it is possible to achieve recording at a lower magnetic field strength.

By the way, if the recording bit diameter as a recording magnetic domain and the recording bit interval become smaller than the beam diameter of a light beam which is emitted by the semiconductor laser and converged on the magneto-optical recording medium, deterioration of the readout characteristics occurs for the reason below. When the light beam is converged on a target recording bit, an adjacent recording bit enters into the beam diameter, and thus individual recording bits cannot be read out separately.

In order to solve such a drawback, Japanese Publication for Unexamined Patent Application No. 150418/1994 (Tokukaihei 6-150418) proposes a magnetically induced super resolution magneto-optical recording medium including a readout layer which is in an in-plane magnetization state at room temperature and changes into a perpendicular magnetization state with a rise in temperature, and a non-magnetic intermediate layer between the readout layer and a recording layer which achieves magnetostatic coupling with the readout layer.

In this structure, information recorded in a recording magnetic domain in the in-plane magnetization state is masked. Therefore, even when an adjacent recording bit enters into the diameter of the light beam converged on the magneto-optical recording medium, it is possible to separately read out individual recording bits, thereby achieving magnetically induced super resolution readout.

Thus, the recording magnetic field can be certainly decreased by achieving exchange coupling between the recording layer and the magnetic layer like the above-mentioned conventional examples. However, in order to meet recent high-speed, more compact, less power consuming recording and reading apparatuses, a further decrease in the recording magnetic field is required for the magneto-optical recording media and magnetically induced super resolution magneto-optical recording media.

SUMMARY OF THE INVENTION

It is an object of the present invention to provide a magneto-optical recording medium capable of further decreasing a recording magnetic field, a recording method and a magneto-optical recording apparatus for recording information thereon.

In order to achieve the above object, a magneto-optical recording medium of the present invention is based on a magneto-optical recording medium having a recording layer on which information is recorded by heating the recording layer to a temperature not lower than a recording temperature and applying an external magnetic field, and characterized in including an auxiliary recording layer which achieves magnetostatic coupling with the recording layer, is in an in-plane magnetization state at temperatures lower than the recording temperature and in a perpendicular magnetization state at temperatures not lower than the recording temperature.

In this structure, when recording information, the magnetization of the auxiliary recording layer is aligned with a magnetization direction (perpendicular direction) corresponding to information to be recorded, by the external magnetic field, and a leakage magnetic field occurs. Consequently, a total magnetic field, which is produced by adding the leakage magnetic field and the external magnetic field together, acts on the recording layer. It is thus possible to execute recording at a lower magnetic field strength compared to a structure in which information is recorded only by the external magnetic field.

Namely, the magneto-optical recording medium of the present invention can perform recording on the recording layer by causing the leakage magnetic field from the auxiliary recording layer to act on the recording layer. Thus, there is a fundamental difference between the magneto-optical recording medium of the present invention and the above-mentioned conventional magneto-optical recording medium using an exchange coupling force. In general, an external magnetic field required for aligning the magnetization direction of an in-plane magnetization layer, which changes into a perpendicular magnetization state with a rise in temperature, with a desired direction (upward or downward direction) under a heated condition is lower than an external magnetic field required for switching the magnetization of a magnetic layer which achieves exchange coupling with the recording layer. Therefore, the magneto-optical recording medium of the present invention enables recording at a lower magnetic field strength than that for the conventional magneto-optical recording medium.

A magneto-optical recording method of the present invention is based on a magneto-optical recording method for recording information on a recording layer by applying a light beam to a magneto-optical recording medium including at least the recording layer and an auxiliary recording layer which achieve magnetostatic coupling with each other and by applying an external magnetic field thereto, and characterized in aligning the magnetization direction of the auxiliary recording layer with the direction of the external magnetic field by the external magnetic field and aligning the magnetization direction of the recording layer with the direction of the external magnetic field by a total magnetic field produced by adding a leakage magnetic field from the auxiliary recording layer and the external magnetic field together.

In this method, since information is recorded on the magneto-optical recording medium by the total magnetic field produced by adding the leakage magnetic field from the auxiliary recording layer to the external magnetic field, it is possible to achieve a decrease in the external magnetic field to be applied.

A magneto-optical recording apparatus of the present invention is based on a magneto-optical recording apparatus including heating means for heating a recording region to a temperature not lower than a recording temperature by applying a light beam to a magneto-optical recording medium having at least a recording layer and an auxiliary recording layer which achieve magnetostatic coupling with each other, and characterized in including external magnetic field applying means for applying to portions of the recording layer and auxiliary recording layer corresponding to the recording region an external magnetic field Mg satisfying the relationship $$Mh \leq Mg < Mr$$

where Mr is an applied magnetic field required for aligning the magnetization direction of a portion of the recording layer heated to a temperature not lower than the recording temperature with the direction of the external magnetic field when the recording layer is present alone, and Mh is an applied magnetic field required for aligning the magnetization direction of a portion of the auxiliary recording layer heated to a temperature not lower than the recording temperature with the direction of the external magnetic field.

In this structure, since the external magnetic field to be applied is small, it is possible to achieve a reduction in the size of the apparatus.

For a fuller understanding of the nature and advantages of the invention, reference should be made to the ensuing detailed description taken in conjunction with the accompanying drawings.

DESCRIPTION OF THE PREFERRED EMBODIMENTS

Embodiment 1

The following description will explain Embodiment 1 of the present invention with reference to the drawings.

Figure 1:
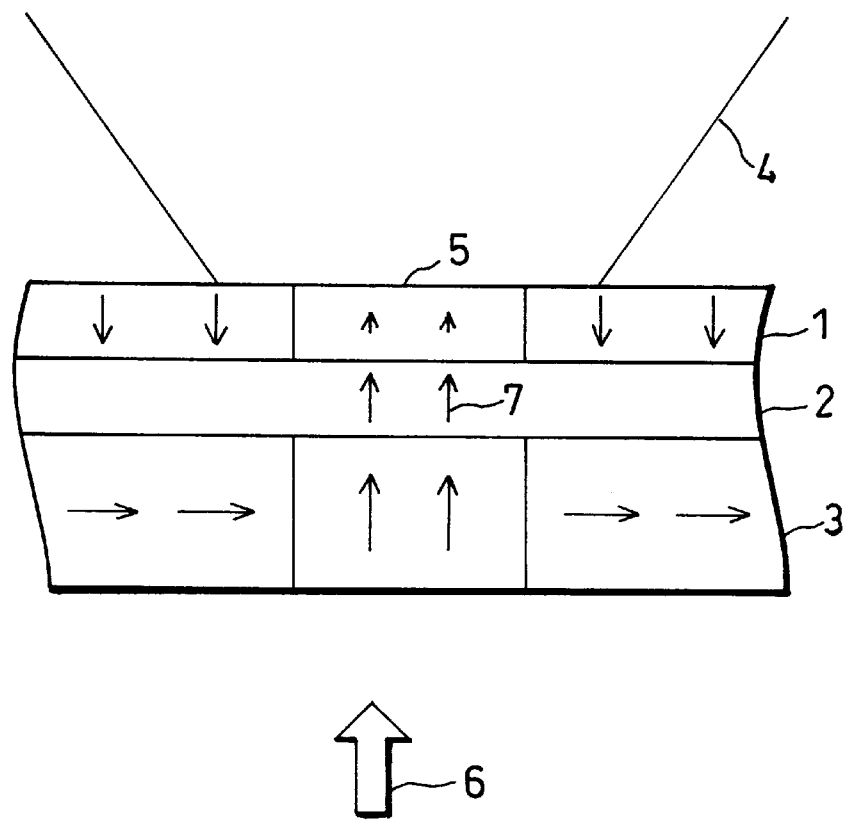
FIG. 1 is an explanatory view showing the principle of recording and reading information on a magneto-optical disk according to Embodiment 1 of the present invention.

FIG. 1 explains the magnetization state of a magneto-optical recording medium of Embodiment 1 when performing recording.

The magneto-optical recording medium of Embodiment 1 includes a recording layer 1, a non-magnetic intermediate layer 2, and an auxiliary recording layer 3. A Curie temperature recording method is used as the method of recording information on a magneto-optical disk according to Embodiment 1. In this method, recording is performed by converging a light beam 4 emitted by a semiconductor laser on the recording layer 1 by means of an objective lens, and causing the magnetization direction of the recording layer 1 to be parallel to the direction of an external magnetic field in the heated portion.

Here, the recording layer 1 is a perpendicular magnetization film having a magnetization in a direction perpendicular to the film surface at temperatures ranging from room temperature to a recording temperature at which recording is performed. The auxiliary recording layer 3 is a magnetic film which has a magnetization in an in-plane direction with respect to the film surface, i.e., an in-plane magnetization state, at a portion showing no temperature rise, an d has a magnetization in a direction perpendicular to the film surface, i.e., a perpendicular magnetization state, at the recording temperature.

The recording layer 1 is heated to the recording temperature by the converged light beam 4. In a recording-temperature region 5 heated to the recording temperature, the coercive force of the recording layer 1 becomes extremely small, and the magnetization direction thereof becomes parallel to the direction of an applied external magnetic field, thereby achieving recording.

Namely, the recording temperature includes the Curie temperature of the recording layer 1. In recording, the coercive forces of the recording layer 1 and the auxiliary recording layer 3 are reduced by heating the recording layer 1 and the auxiliary recording 3 to temperatures in the vicinity of the Curie temperature of the recording layer 1. Simultaneously the direction of an external magnetic field 6 is changed to an upward direction or a downward direction, perpendicular to the film surface of the magneto-optical recording medium, by a magnetic-field modulation method according to information to be recorded. Information is recorded by switching the magnetization direction of the recording layer 1 to the same direction as the external magnetic field 6.

In Embodiment 1, the auxiliary recording layer 3 shows in-plane magnetization outside of the recording-temperature region 5, and perpendicular magnetization within the recording-temperature region 5. Therefore, a leakage magnetic field from the auxiliary recording layer 3 is not present outside of the recording-temperature region 5, and a leakage magnetic field 7 from the auxiliary recording layer 3 is present within the recording-temperature region 5. Here, the magnetization direction of the auxiliary recording layer 3 is parallel to that of the external magnetic field 6. Consequently, the leakage magnetic field 7 from the auxiliary recording layer 3 becomes parallel to the external magnetic field 6. As a result, the external magnetic field 6 and the leakage magnetic field 7 from the auxiliary recording layer 3 function as external magnetic fields. Therefore, it is possible to achieve recording with a smaller magnetic field compared to the conventional structure.

Moreover, in a low-temperature portion of the auxiliary recording layer 3 where the temperature has not been raised, the magnetization direction is not aligned with the direction of the external magnetic field 6. Namely, the in-plane magnetization state is retained. The magnetization direction in the low-temperature portion is aligned with the direction of the external magnetic field 6 when the magnetization state is changed into the perpendicular magnetization state by heating. Therefore, the magnetization direction of the auxiliary recording layer 3 can be easily aligned with the direction of the external magnetic field 6 at a lower magnetic field strength compared to an external magnetic field required for reversing the magnetization of the magnetic layer which has already been in the perpendicular magnetization before being heated. Hence, it is possible to further decrease the external magnetic field 6 necessary for recording.

A magneto-optical recording apparatus for recording information on such a magneto-optical recording medium has at least heating means for heating the magneto-optical recording medium by applying the laser beam 4, and external magnetic field applying means for applying the external magnetic field 6. Here, if a magnetic field necessary for reversing the magnetization of the recording layer 1 which has been heated to a temperature not lower than the recording temperature when the recording layer 1 is present alone is represented by Mr and a magnetic field necessary for aligning the magnetization direction of the auxiliary recording layer 3 which has been heated to a temperature not lower than the recording temperature with the direction (perpendicular direction) of the applied external magnetic field is Mh, the external magnetic field applying means needs to be capable of applying at least an external magnetic field 6 which is not smaller than Mh. In addition, since recording is performed based on the above-mentioned principle, recording can be carried out even when the external magnetic field 6 is smaller than Mr. Thus, in order to reduce the size of the external magnetic field applying means by a decrease in the external magnetic field to be applied, it is preferred to set the external magnetic field 6 to a value that is not smaller than Mh but smaller than Mr.

Embodiment 1 explains an example in which a magneto-optical disk is used as the magneto-optical recording medium.

Figure 2:
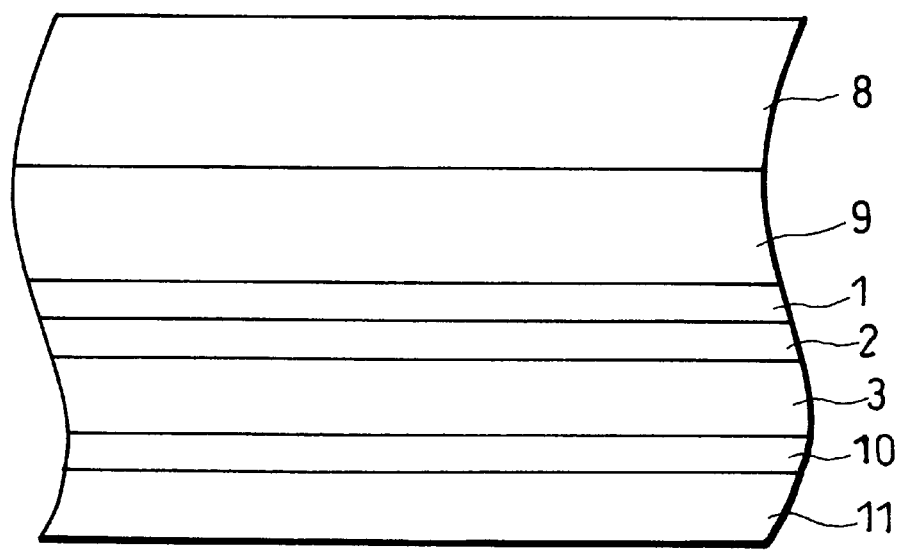
FIG. 2 is an explanatory view showing the film structure of the magneto-optical disk of Embodiment 1.

As illustrated in FIG. 2, the magneto-optical disk according to Embodiment 1 includes a disk main body formed by layering a substrate 8, a transparent dielectric layer 9, a recording layer 1, a non-magnetic intermediate layer 2, an auxiliary recording layer 3, a protective layer 10, and an overcoat layer 11 in this order.

The substrate 8 is made of, for example, a transparent material like polycarbonate and formed in a disk shape.

The transparent dielectric layer 9 is formed preferably from materials containing no oxygen, such as AlN, SiN, and AlSiN. The thickness of the transparent dielectric layer 9 needs to be set so as to realize a good interference effect and an increase in the Kerr rotation angle of the medium for incident laser light. The thickness of the transparent dielectric layer 9 is therefore set to about $(\lambda/4n)$ where $\lambda$ is the wavelength of the laser light for reading, and n is the refractive index of the transparent dielectric layer 9. For example, when the wavelength of the laser light is 680 nm, the thickness of the transparent dielectric layer 9 is set to about 40 nm to 100 nm.

The recording layer 1 is formed by a perpendicular magnetization film which is made of a rare-earth and transition metal alloy and has a magnetization perpendicular to the film surface. It is preferred to set the thickness of the recording layer 1 to a value that is not less than 10 nm but not more than 80 nm so as to achieve good recording and readout characteristics.

The non-magnetic intermediate layer 2 is made of either dielectric materials such as AlN, SiN and AlSiN, or non-magnetic metal alloys such as Al, Ti and Ta. The thickness of the non-magnetic intermediate layer 2 is set between 1 nm and 80 nm so as to achieve good magnetostatic coupling between the recording layer 1 and the auxiliary recording layer 3.

The auxiliary recording layer 3 is made of a rare-earth and transition metal alloy, and its magnetic properties are set so that the auxiliary recording layer 3 has a magnetization in an in-plane direction with respect to the film surface at room temperature and a magnetization in a direction perpendicular to the film surface at the recording temperature of the recording layer 1. The thickness of the auxiliary recording layer 3 is set between 10 nm and 200 nm so as to produce a leakage magnetic field of sufficient strength for the recording layer 1.

The protective layer 10 is made of either dielectric materials such as AlN, SiN and AlSiN, or non-magnetic transition metal alloys such as Al, Ti and Ta. The protective layer 10 is provided for the purpose of preventing the oxidation of the rare-earth transition metal alloys used for the recording layer 1 and the auxiliary recording layer 3. The thickness of protective layer 10 is preferably within a range of from 5 nm and 60 nm.

The overcoat layer 11 is formed either by heating a thermosetting resin applied onto the protective layer 10 by spincoating, or by exposing to an ultraviolet ray an ultraviolet-ray-setting resin applied onto the protective layer 10 by spincoating.

The following description will explain a specific example (hereinafter referred to as Example 1) of the magneto-optical disk according to this embodiment by separately describing (1) the fabrication process of the magneto-optical disk and (2) the recording and readout characteristics.

(1) Fabrication Process of the Magneto-Optical Disk

The magneto-optical disk of this embodiment was fabricated through the following steps.

First, a polycarbonate substrate 8 formed in a disk shape with a pregroove and prepits was placed on a substrate holder in a sputtering device provided with an Al target, a DyFeCo alloy target and a GdFeCo alloy target. The inside of the sputtering device was evacuated to $1 \times 10^{-6}$ Torr to be filled with a mixed gas of argon and nitrogen. Then, power was supplied to the Al target under a gas pressure of $4 \times 10^{-3}$ Torr so as to form an 80-nm-thick transparent dielectric layer 9 made of AlN on the substrate 8.

Next, the inside of the sputtering device was evacuated again to $1 \times 10^{-6}$ Torr to be filled with an argon gas. Then, power was supplied to the DyFeCo alloy target under a gas pressure of $4 \times 10^{-3}$ Torr so as to form a 20-nm-thick recording layer 1 made of $Dy_{0.25}(Fe_{0.75}CO_{0.25})_{0.75}$ on the transparent dielectric layer 9. The recording layer 1 is a perpendicular magnetization film having a magnetization in a direction perpendicular to the film surface up to its Curie temperature. The compensation temperature and the Curie temperature of the recording layer 1 were 80° C. and 250° C., respectively.

Subsequently, the inside of the sputtering device was filled with a mixed gas of argon and nitrogen. Then, power was supplied to the Al target under a gas pressure of $4 \times 10^{-3}$ Torr so as to form a 20-nm-thick non-magnetic intermediate layer 2 made of AlN on the recording layer 1.

Next, the inside of the sputtering device was evacuated again to $1 \times 10^{-6}$ Torr to be filled with an argon gas. Then, power was supplied to the GdFeCo alloy target under a gas pressure of $4 \times 10^{-3}$ Torr so as to form a 60-nm-thick auxiliary recording layer 3 made of $Gd_{0.31}(Fe_{0.70}Co_{0.30})_{0.69}$ on the non-magnetic intermediate layer 2. The auxiliary recording layer 3 was in the in-plane magnetization state at 25° C. and in the perpendicular magnetization state at temperatures not lower than 200° C. The Curie temperature of the auxiliary recording layer 3 was 320° C.

Next, the inside of the sputtering device was filled with a mixed gas of argon and nitrogen. Then, power was supplied to the Al target under a gas pressure of $4 \times 10^{-3}$ Torr so as to form a 20-nm-thick protective layer 10 made of AlN on the auxiliary recording layer 3.

Finally, an ultraviolet-ray-setting resin was applied onto the protective layer 10 by spincoating, and exposed to an ultraviolet ray to form an overcoat layer 11.

(2) Recording and Readout Characteristics

The above-mentioned magneto-optical disk was measured to find the dependence of the CNR (carrier to noise ratio) on the recording magnetic field with an optical pickup using the semiconductor laser having a wavelength of 680 nm. The result of the measurement is shown as Example 1 in FIG. 3. A conventional magneto-optical recording medium having a 40-nm-thick Al reflective layer instead of the auxiliary recording layer 3 was measured to find the dependance of the CNR on the recording magnetic field for comparison purposes. The result of the measurement is shown as Comparative Example 1 in FIG. 3. The dependence of the CNR on the recording magnetic field shown in FIG. 3 indicates the results of the measurements carried out under the conditions of a track pitch of 1.1 μm, a recording magnetic domain pitch of 1.2 μm, a recording power of 6.5 mW, and a read power of 1.5 mW.

Figure 3:
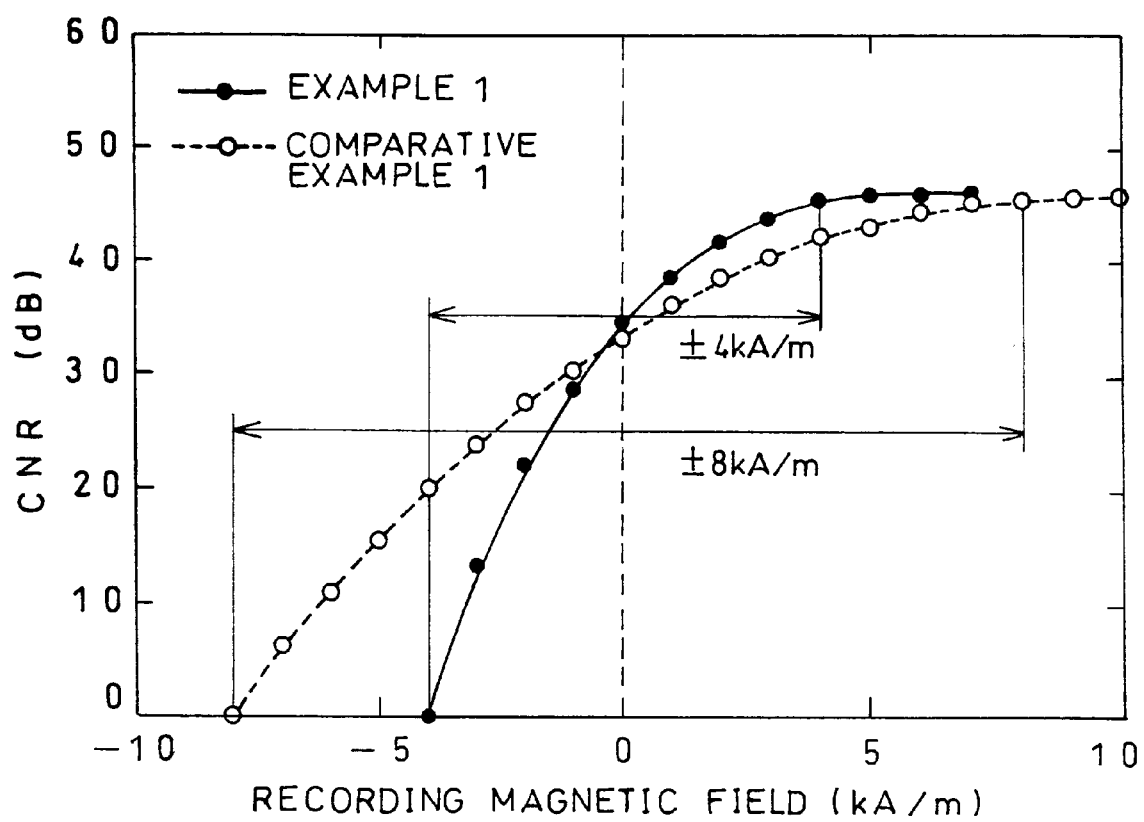
FIG. 3 is a graph showing the recording and readout characteristics of the magneto-optical disk of Embodiment 1.

As shown in FIG. 3, in Comparative Example 1, when the recording magnetic field was −8.0 kA/m, the CNR was zero. Thus, it is understood that erasing is executable by a magnetic field of −8.0 kA/m. Moreover, the CNR was saturated when the recording magnetic field was 8.0 kA/m. Therefore, recording is executable by a magnetic field of 8.0 kA/m. A light beam of a uniform intensity was applied to this disk, and magnetic-field modulation recording was performed with a recording magnetic field which was modulated according to information. The recording was executable at a modulated magnetic field strength of 8.0 kA/m.

On the other hand, in the magneto-optical disk of Example 1, when the recording magnetic field was −4.0 kA/m, the CNR was zero. Thus, erasing is executable by a magnetic field of −4.0 kA/m. In addition, the CNR was saturated when the recording magnetic field was 4.0 kA/m. Therefore, it is understood that recording is executable by a magnetic field of 4.0 kA/m. The light beam of a uniform intensity was applied to this disk, and magnetic-field modulation recording was performed with a recording magnetic field which was modulated according to information. The recording was executable at a modulated magnetic field strength of 4.0 kA/m.

In short, the conventional magneto-optical disk of Comparative Example 1 requires a recording and erasing magnetic field of ±8.0 kA/m. In contrast, it was confirmed that a recording and erasing magnetic field of ±4.0 kA/m was sufficient for the magneto-optical disk of Example 1.

Next, the thickness of the recording layer 1 of Example 1 was varied, and the CNR and the recording and erasing magnetic field were measured under the same recording and readout conditions as in Example 1. The results of the measurements are shown in Table 1. For the measurements of the CNR, recording was performed to achieve a maximum CNR by changing the recording power according to the thickness of the recording layer 1.

TABLE 1

| Thickness of recording layer (nm) | CNR (db) | Recording and erasing magnetic field (kA/m) |
|---|---|---|
| 5 | 32.0 | ±2.5 |
| 10 | 41.0 | ±3.2 |
| 15 | 45.5 | ±3.6 |
| 20 | 46.0 | ±4.0 |
| 30 | 45.5 | ±4.2 |
| 40 | 45.0 | ±4.8 |
| 60 | 43.5 | ±6.3 |

TABLE 1-continued

| Thickness of recording layer (nm) | CNR (db) | Recording and erasing magnetic field (kA/m) |
|---|---|---|
| 80 | 43.0 | ±7.2 |
| 100 | 43.0 | ±8.5 |

In Comparative Example 1, the recording and erasing magnetic field was ±8.0 kA/m (this value was a substantially optimum value when the thickness of the recording layer of Comparative Example 1 was varied). Whereas, in Example 1, when the thickness of the recording layer was increased to 100 nm, the recording and erasing magnetic field increased to ±8.5 kA/m, i.e., become larger than the recording and erasing magnetic field of comparative Example 1, with an increase in a demagnetizing field in the recording layer 1. In order to decrease the recording and erasing magnetic field to be smaller than that of Comparative Example 1, the recording layer 1 needs to have a thickness of not more than 80 nm. Moreover, when the thickness of the recording layer 1 was 5 nm, it was difficult to read out signals on the magneto-optical disk because the CNR was extremely lowered to 32.0 dB due to the too small thickness of the recording layer 1. For the reasons mentioned above, it is necessary to set the thickness of the recording layer 1 to a value that is not less than 10 nm but not more than 80 nm. Furthermore, in order to obtain a high CNR using the optical interference effect produced by multiple reflection between the recording layer 1 and the auxiliary recording layer 3, it is preferred to arrange the thickness of the recording layer 1 to a value that is not less than 15 nm but not more than 40 nm.

Next, the thickness of the non-magnetic intermediate layer 2 of Example 1 was varied, and the CNR and the recording and erasing magnetic field were measured under the same recording and readout conditions as in Example 1. Table 2 shows the results of the measurements. Here, recording was performed to achieve a maximum CNR by changing the recording power according to the thickness of the non-magnetic intermediate layer 2.

TABLE 2

| Thickness of non-magnetic intermediate layer (nm) | CNR (dB) | Recording and erasing magnetic field (kA/m) |
|---|---|---|
| 0.5 | 33.0 | ±9.4 |
| 1 | 41.0 | ±3.1 |
| 5 | 44.5 | ±3.4 |
| 10 | 46.0 | ±3.8 |
| 20 | 46.0 | ±4.0 |
| 40 | 45.0 | ±4.5 |
| 60 | 44.5 | ±5.0 |
| 80 | 44.0 | ±7.0 |
| 100 | 44.0 | ±8.0 |

It is understood from Table 2 that a significant decrease in the CNR and a significant increase in the recording and reading magnetic field occurred when the thickness of the non-magnetic intermediate layer 2 was 0.5 nm. The reason for such results is that good magneto-static coupling was not achieved between the recording layer 1 and the auxiliary recording layer 3 because the non-magnetic intermediate layer 2 was not uniform. Additionally, when the thickness of the non-magnetic intermediate layer 2 was 100 nm, the effect of enhancing the external magnetic field of the auxiliary recording layer 3 was not produced due to an increase in the distance between the recording layer 1 and the auxiliary recording layer 3. Thus, it is understood that a recording and erasing magnetic field of ±8.0 kA/m is required like Comparative Example 1. For the reasons mentioned above, the non-magnetic intermediate layer 2 needs to have a thickness within a range of from 1 nm to 80 nm.

Next, the thickness of the auxiliary recording layer 3 of Example 1 was varied, and the CNR and the recording and reasing magnetic field were measured under the same recording and readout conditions as in Example 1. Table 3 shows the results of the measurements. Here, recording was performed to achieve a maximum CNR by changing the recording power according to the thickness of the auxiliary recording layer 3.

TABLE 3

| Thickness of auxiliary recording layer (nm) | CNR (dB) | Recording and erasing magnetic field (kA/m) |
|---|---|---|
| 5 | 42.0 | ±8.0 |
| 10 | 44.5 | ±6.4 |
| 20 | 46.0 | ±4.0 |
| 50 | 46.0 | ±3.6 |
| 100 | 45.5 | ±2.7 |
| 150 | 45.0 | ±2.4 |
| 200 | 41.5 | ±2.2 |
| 250 | 33.0 | ±2.0 |

It is understood from Table 3 that when the thickness of the auxiliary recording layer 3 was reduced to 5 nm, the effect of enhancing the external magnetic field of the auxiliary recording layer 3 was not produced because the auxiliary recording layer 3 was too thin. Thus, a recording and erasing magnetic field of ±8.0 kA/m is required like Comparative Example 1. It was also found from Table 3 that the CNR was significantly lowered to 33.0 dB when the thickness of the auxiliary recording layer 3 was 250 nm. The reason for such a result is that an increase in the heat capacity due to an increase in the thickness of the auxiliary recording layer 3 causes a shortage of the recording power. Thus, a practical thickness of the auxiliary recording layer 3 is not more than 200 nm. For the reasons mentioned above, the thickness of the auxiliary recording layer 3 needs to be in a range of from 10 nm to 200 nm.

Example 1 shows the results of measuring the magneto-optical disk having the recording layer 1 made of $Dy_{0.25}(Fe_{0.75}Co_{0.25})_{0.75}$ and the auxiliary recording layer 3 made of $Gd_{0.31}(Fe_{0.70}Co_{0.30})_{0.69}$. However, a similar decrease in the recording and erasing magnetic field can be achieved by compositions and materials other than those mentioned above.

The CNR and the recording and erasing magnetic field of a magneto-optical recording medium having the structure of Example 1 and the auxiliary recording layer 3 represented by $Gd_x(Fe_yCo_{1-y})_{1-x}$ were measured by changing the values of X and Y under the same recording and readout conditions as in Example 1. Table 4 shows the results of the measurements. Here, recording was performed to achieve a maximum CNR by changing the recording power according to each structure. A temperature at which the auxiliary recording layer 3 changes into the perpendicular magnetization state is also shown as Tp (°C.) in Table 4.

TABLE 4

| X | Y | Tp (° C.) | CNR (dB) | Recording and erasing magnetic field (kA/m) |
|---|---|---|---|---|
| 0.28 | 0.70 | 100 | 46.0 | ±8.0 |
| 0.29 | 0.70 | 130 | 45.5 | ±7.4 |
| 0.30 | 0.70 | 185 | 46.0 | ±5.2 |
| 0.31 | 0.70 | 200 | 46.0 | ±4.0 |
| 0.32 | 0.70 | 225 | 45.0 | ±5.5 |
| 0.33 | 0.70 | 250 | 46.0 | ±6.9 |
| 0.34 | 0.70 | 265 | 45.5 | ±9.5 |
| 0.31 | 0.50 | — | 45.0 | ±9.2 |
| 0.31 | 0.55 | — | 45.5 | ±8.2 |
| 0.31 | 0.60 | 210 | 46.5 | ±7.3 |
| 0.31 | 0.65 | 205 | 46.0 | ±5.1 |
| 0.31 | 0.70 | 200 | 46.0 | ±4.0 |
| 0.31 | 0.75 | 200 | 46.5 | ±4.8 |
| 0.31 | 0.80 | 190 | 45.5 | ±6.7 |
| 0.31 | 0.85 | 180 | 45.5 | ±8.0 |

It is understood from Table 4 that when X and Y are in the ranges $0.29 \leq X \leq 0.33$ and $0.60 \leq Y \leq 0.80$, respectively, a smaller recording and erasing magnetic field than the recording and erasing magnetic field (±8 kA/m) of Comparative Example 1 is realized. When X is in the range X<0.29, the compensation temperature of the auxiliary recording layer 3 is lowered, and therefore the magnetization of the auxiliary recording layer 3 becomes smaller. Thus, it is difficult to retain good magnetostatic coupling between the auxiliary recording layer 3 and the recording layer 1. When X is in the range X>0.33, since the auxiliary recording layer 3 is in the in-plane magnetization state at the Curie temperature of the recording layer 1, it is difficult to retain good magnetostatic coupling between the auxiliary recording layer 3 and the recording layer 1. When Y is in the range Y<0.60, since the Co content increases, it is difficult to achieve the perpendicular magnetization state in the auxiliary recording layer 3. Consequently, the leakage magnetic field from the recording layer 1 is enhanced by the in-plane magnetization of the auxiliary recording layer 3, and the recording and erasing magnetic field becomes larger than the recording and erasing magnetic field (±8 kA/m) of Comparative Example 1. When Y is in the range Y>0.80, since the Co content decreases, the Curie temperature of the auxiliary recording layer 3 becomes lower and the magnetization of the auxiliary recording layer 3 becomes smaller. It is therefore difficult to retain good magnetostatic coupling between the auxiliary recording layer 3 and the recording layer 1.

It is understood from the temperature Tp at which the auxiliary recording layer 3 changes into the perpendicular magnetization state that, if Tp is within a range of from 130° C. to 250° C. when the Curie temperature of the recording layer 1 is 250° C., the effect of decreasing the recording and erasing magnetic field is observed. Namely, the temperature Tp at which the auxiliary recording layer 3 changes into the perpendicular magnetization state needs to satisfy the conditional expression $$Tc1-120° C. \leq Tp \leq Tc1 \quad (A)$$

where Tc1 is the Curie temperature of the recording layer 1.

As the materials for the recording layer 1 other than DyFeCo, it is possible to use rare-earth and transition metal alloys, such as TbFeCo, TbDyFeCo, GdTbFeCo and GdDyFeCo, which are currently used for the magneto-optical recording media.

Embodiment 2

The following description will explain Embodiment 2 of the present invention with reference to the drawings. The members having the same function as in the above-mentioned embodiment will be designated by the same code and their description will be omitted.

Figure 4:
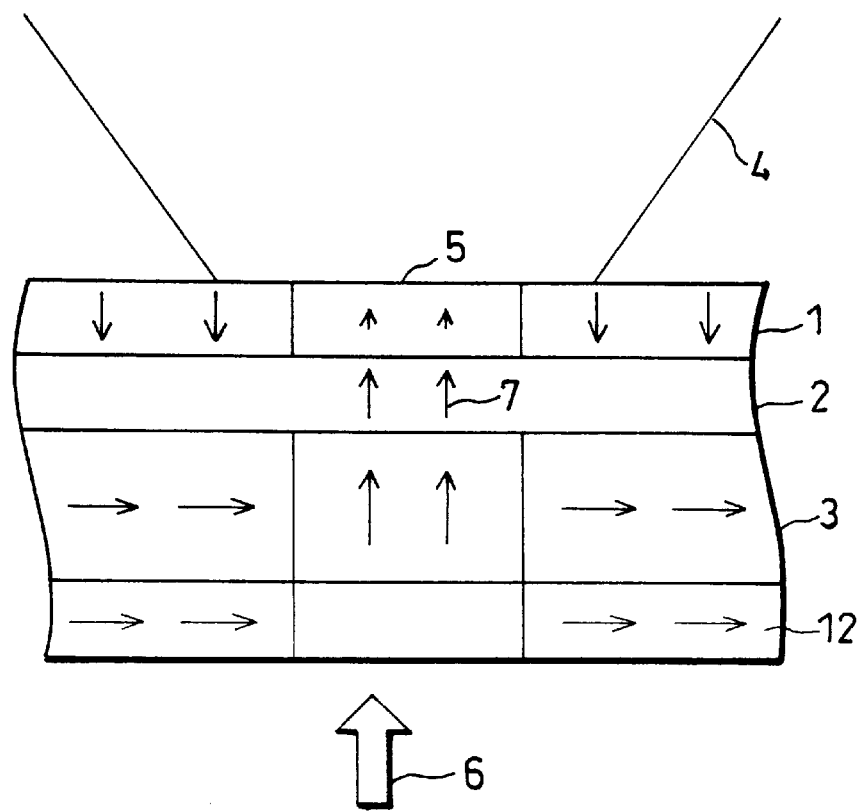
FIG. 4 is an explanatory view showing the principle of recording and reading information on a magneto-optical disk according to Embodiment 2.

FIG. 4 explains the magnetization state when recording information on a magneto-optical recording medium according to Embodiment 2.

The magneto-optical recording medium of Embodiment 2 includes a recording layer 1, a non-magnetic intermediate layer 2, an auxiliary recording layer 3, and an in-plane magnetization layer 12. The Curie temperature recording method is used as the method of recording information on a magneto-optical disk according to Embodiment 2. In this method, recording is performed by converging the light beam 4 emitted by the semiconductor laser on the recording layer 1 by means of an objective lens, and causing the magnetization direction of the recording layer 1 to be parallel to the direction of an external magnetic field in the heated portion.

Here, the recording layer 1 is a perpendicular magnetization film having a magnetization in a direction perpendicular to the film surface at temperatures ranging from room temperature to the recording temperature at which recording is performed. The auxiliary recording layer 3 is a magnetic film which has a magnetization in an in-plane direction with respect to the film surface, i.e., an in-plane magnetization state, in a portion showing no temperature rise, and changes into a perpendicular magnetization state to have a magnetization in a direction perpendicular to the film surface at the recording temperature.

The in-plane magnetization layer 12 achieves exchange coupling with the auxiliary recording layer 3, and its Curie temperature is set so that no magnetization is present at the recording temperature. By achieving exchange coupling between the auxiliary recording layer 3 and the in-plane magnetization layer 12, the auxiliary recording layer 3 realizes such properties that the auxiliary recording layer 3 has a magnetization in an in-plane direction with respect to the film surface, i.e., the in-plane magnetization state, in a portion showing no temperature rise, and a magnetization in a direction perpendicular to the film surface, i.e., the perpendicular magnetization state, at the recording temperature.

The recording layer 1 is heated to the recording temperature by the converged light beam 4. In the recording-temperature region 5 heated to the recording temperature, the coercive force of the recording layer 1 becomes extremely small, and the magnetization direction of the recording layer 1 becomes parallel to the direction of an external magnetic field to be applied, thereby achieving recording.

In Embodiment 2, the auxiliary recording layer 3 and the in-plane magnetization layer 12 achieve exchange coupling, and the magnetization direction is certainly aligned in the in-plane direction outside of the recording-temperature region 5 because of the function of the in-plane magnetization layer 12. Consequently, a leakage magnetic field is not produced. On the other hand, in the recording-temperature region 5, the coercive force of the in-plane magnetization layer 12 becomes smaller, and the auxiliary recording layer 3 is in the perpendicular magnetization state. Consequently, the magnetization direction of the auxiliary recording layer 3 becomes parallel to the direction of the external magnetic field 6, and the leakage magnetic field 7 is produced. Namely, in contrast to a structure including no in-plane magnetization layer 12, the magnetization direction of the auxiliary recording layer 3 is not aligned in a direction oblique to the film surface, and therefore a leakage magnetic field is not produced outside of the recording-temperature region 5. It is thus possible to prevent vicious effects on the recording layer 1. Consequently, the region in which the leakage magnetic field 7 is produced is certainly controlled to the size of the recording magnetic domain. Accordingly, the region where the magnetic field is produced is narrowed, and high-density recording is achieved.

Embodiment 2 explains an example in which a magneto-optical disk is used as the magneto-optical recording medium.

Figure 5:
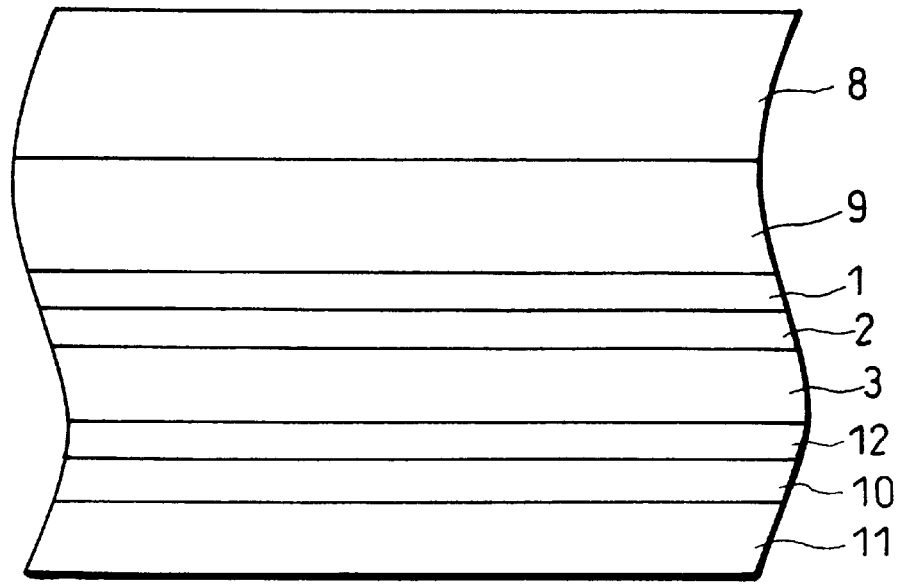
FIG. 5 is an explanatory view showing the film structure of the magneto-optical disk of Embodiment 2.

As illustrated in FIG. 5, the magneto-optical disk according to Embodiment 2 includes a disk main body formed by layering the substrate 8, transparent dielectric layer 9, recording layer 1, non-magnetic intermediate layer 2, auxiliary recording layer 3, in-plane magnetization layer 12, protective layer 10, and overcoat layer 11 in this order.

The substrate 8, transparent dielectric layer 9, recording layer 1, non-magnetic intermediate layer 2, protective layer 10, and overcoat layer 11 are the same as those in Embodiment 1. It is preferred to arrange the thicknesses and the magnetic properties of these layers to be the same as those in Embodiment 1.

The auxiliary recording layer 3 and the in-plane magnetization layer 12 are made of rare-earth and transition metal alloys, and achieve exchange coupling therebetween. The exchange coupling enables the auxiliary recording layer 3 to have such magnetic properties that it has a magnetization in an in-plane direction with respect to the film surface at room temperature and a magnetization in a direction perpendicular to the film surface at the recording temperature of the recording layer 1.

The following description will explain a specific example (hereinafter referred to as Example 2) of the magneto-optical disk according to this embodiment by separately describing (1) the fabrication process of the magneto-optical disk and (2) the recording and readout characteristics.

(1) Fabrication Process of the Magneto-Optical Disk

The magneto-optical disk of Example 2 was fabricated through the following steps.

First, a polycarbonate substrate 8 formed in a disk shape with a pregroove and prepits was placed on a substrate holder in a sputtering device provided with an Al target, a DyFeCo alloy target and two kinds of GdFeCo alloy targets corresponding to the auxiliary recording layer 3 and the in-plane magnetization layer 12. Then, a 80-nm-thick transparent dielectric layer 9 made of AlN, a 20-nm-thick recording layer 1 made of $Dy_{0.25}(Fe_{0.75}Co_{0.25})_{0.75}$, a 20-nm-thick non-magnetic intermediate layer 2 made of AlN were formed in the same manner as in Example 1.

Subsequently, a 40-nm-thick auxiliary recording layer 3 made of $Gd_{0.26}(Fe_{0.80}Co_{0.20})_{0.74}$ was formed using the GdFeCo alloy target corresponding to the auxiliary recording layer 3. The auxiliary recording layer 3 is a perpendicular magnetization film which always exhibits a magnetization in a direction perpendicular to the film surface when it is present alone, and has a Curie temperature of 220° C.

Next, a 20-nm-thick in-plane magnetization layer 12 made of $Gd_{0.11}(Fe_{0.90}Co_{0.10})_{0.89}$ was formed using the GdFeCo alloy target corresponding to the in-plane magnetization layer 12. The in-plane magnetization layer 12 is an in-plane magnetization film which always has a magnetization in an in-plane direction with respect to the film surface, and a Curie temperature of 220° C.

Thus, by forming the auxiliary recording layer 3 and the in-plane magnetization layer 12 successively, exchange coupling is achieved between these layers. The exchange coupling allows the auxiliary recording layer 3 which originally shows perpendicular magnetization at temperatures lower than the Curie temperature of the in-plane magnetization layer 12 to have the in-plane magnetization state. It is thus possible to realize an auxiliary recording layer which changes from the in-plane magnetization state to the perpendicular magnetization state with a rise in temperature like Example 1.

Next, a 20-nm-thick protective layer 10 made of AlN, and an overcoat layer 11 were formed in the same manner as in Example 1.

(2) Recording and Readout Characteristics

The above-mentioned magneto-optical disk was measured to find the dependence of the CNR (carrier to noise ratio) on the recording magnetic field with an optical pickup using the semiconductor laser having a wavelength of 680 nm. As a result, properties similar to those of Example 1 shown in FIG. 3 were found. Specifically, it was confirmed that a CNR of 46 dB, and recording and erasing by a recording and erasing magnetic field of ±4.0 kA/m were achieved by the magneto-optical disk of Embodiment 2.

Next, the thicknesses of the recording layer 1 and the non-magnetic intermediate layer 2 of Example 2 were varied, and the strength of the recording and erasing magnetic field was compared with the recording and erasing magnetic field (±8 kA/m) of Comparative Example 1. As a result, it was confirmed that the recording layer 1 needs to have a thickness in a range of from 10 nm to 80 nm, and the non-magnetic intermediate layer 2 needs to have a thickness in a range of from 1 nm to 80 nm.

Then, the thicknesses of the auxiliary recording layer 3 of Example 2 was varied, and the CNR and the recording and erasing magnetic field were measured under the same recording and readout conditions. The results of the measurements are shown in Table 5. For the measurements of the CNR, recording was performed to achieve a maximum CNR by changing the recording power according to the thickness of the auxiliary recording layer 3.

TABLE 5

| Thickness of auxiliary recording layer (nm) | CNR (dB) | Recording and erasing magnetic field (kA/m) |
| --- | --- | --- |
| 5 | 45.0 | ±8.0 |
| 10 | 45.5 | ±6.5 |
| 15 | 45.5 | ±5.8 |
| 20 | 46.0 | ±4.9 |
| 30 | 45.5 | ±4.2 |
| 40 | 46.0 | ±4.0 |
| 60 | 46.0 | ±4.6 |
| 80 | 45.5 | ±5.2 |
| 100 | 45.0 | ±6.3 |
| 120 | 45.5 | ±7.2 |
| 140 | 45.0 | ±9.4 |

It is understood from Table 5 that when the thickness of the auxiliary recording layer 3 was reduced to 5 nm, the effect of enhancing the external magnetic field by the auxiliary recording layer 3 was not produced because the auxiliary recording layer 3 was too thin. Thus, a recording and erasing magnetic field of ±8.0 kA/m is required like Comparative Example 1. It is also understood that a recording and erasing magnetic field of ±9.4 kA/m was necessary when the thickness of the auxiliary recording layer 3 was set to 140 nm. In Example 2, a magnetic film which was originally in the perpendicular magnetization state was used for the auxiliary recording layer 3, and a transition from the in-plane magnetization state to the perpendicular magnetization state with an increase in temperature was realized by achieving exchange coupling between the auxiliary recording layer 3 and the in-plane magnetization layer 12. Therefore, when the thickness of the auxiliary recording layer 3 is increased, the magnetic properties of the auxiliary recording layer 3 becomes stronger. As a result, the transition from the in-plane magnetization state to the perpendicular magnetization state is not realized with an increase in temperature, and therefore the auxiliary recording layer 3 is always in the perpendicular magnetization state. For the reasons mentioned above, the thickness of the auxiliary recording layer 3 needs to be in a range of from 10 nm to 120 nm.

Next, the thickness of the in-plane magnetization layer 12 of Example 2 was varied, and the CNR and the recording and erasing magnetic field were measured under the same recording and readout conditions. The results of the measurements are shown in Table 6. For the measurements of the CNR, recording was performed to achieve a maximum CNR by changing the recording power according to the thickness of the in-plane magnetization layer 12.

TABLE 6

| Thickness of in-plane magnetization layer (nm) | CNR (dB) | Recording and erasing magnetic field (kA/m) |
|---|---|---|
| 3 | 45.0 | ±9.0 |
| 5 | 45.5 | ±6.5 |
| 10 | 45.5 | ±5.8 |
| 20 | 46.0 | ±4.0 |
| 50 | 45.5 | ±4.2 |
| 100 | 45.5 | ±4.0 |
| 150 | 42.5 | ±4.4 |
| 200 | 30.5 | ±4.2 |
| 250 | 25.0 | ±4.3 |

It is understood from Table 6 that when the thickness of the in-plane magnetization layer 12 was reduced to 3 nm, a force for causing the auxiliary recording layer 3 to change into the in-plane magnetization state became weaker, and the transition from the in-plane magnetization state to the perpendicular magnetization state with a rise in temperature was not realized. Consequently, the auxiliary recording layer 3 is always in the perpendicular magnetization state, and thus a recording and erasing magnetic field of ±9.0 kA/m is required. It was also found that the CNR was significantly lowered to 30.5 dB when the thickness of the in-plane magnetization layer 12 was 200 nm. The reason for such a result is that an increase in the heat capacity due to the increase in the thickness of the in-plane magnetization layer 12 causes a shortage of the recording power. Thus, a practical thickness of the in-plane magnetization layer 12 is not more than 150 nm. For the reasons mentioned above, the thickness of the in-plane magnetization layer 12 needs to be in a range of from 5 nm to 150 nm.

Example 2 shows the results of measuring the magneto-optical disk having the recording layer 1 made of $Dy_{0.25}(Fe_{0.75}Co_{0.25})_{0.75}$, the auxiliary recording layer 3 made of $Gd_{0.26}(Fe_{0.80}Co_{0.20})_{0.74}$, the in-plane magnetization layer 12 made of $Gd_{0.11}(Fe_{0.90}Co_{0.10})_{0.89}$. However, a similar decrease in the recording and erasing magnetic field can be achieved by compositions and materials other than those mentioned above.

The CNR and the recording and erasing magnetic field of a magneto-optical recording medium having the structure of Example 2 and the auxiliary recording layer 3 represented by $Gd_x(Fe_yCo_{1-y})_{1-x}$ were measured by changing the values of X and Y under the same recording and readout conditions as in Example 1. Table 7 shows the results of the measurements. Here, recording was performed to achieve a maximum CNR by changing the recording power according to each structure.

TABLE 7

| X | Y | CNR (dB) | Recording and erasing magnetic field (kA/m) |
|---|---|---|---|
| 0.20 | 0.80 | 46.0 | ±9.0 |
| 0.22 | 0.80 | 45.5 | ±7.6 |
| 0.24 | 0.80 | 46.0 | ±6.6 |
| 0.25 | 0.80 | 46.5 | ±5.2 |
| 0.26 | 0.80 | 45.0 | ±4.0 |
| 0.27 | 0.80 | 45.5 | ±4.5 |
| 0.28 | 0.80 | 45.0 | ±6.5 |
| 0.29 | 0.80 | 46.0 | ±5.8 |
| 0.30 | 0.80 | 46.5 | ±5.0 |
| 0.31 | 0.80 | 46.0 | ±4.2 |
| 0.32 | 0.80 | 46.5 | ±5.9 |
| 0.33 | 0.80 | 46.0 | ±7.9 |
| 0.34 | 0.80 | 46.0 | ±9.5 |
| 0.26 | 0.55 | 45.5 | ±8.5 |
| 0.26 | 0.60 | 45.0 | ±7.4 |
| 0.26 | 0.65 | 45.5 | ±5.5 |
| 0.26 | 0.70 | 46.5 | ±4.8 |
| 0.26 | 0.75 | 46.0 | ±4.2 |
| 0.26 | 0.80 | 46.0 | ±4.0 |
| 0.26 | 0.85 | 46.5 | ±5.2 |
| 0.26 | 0.90 | 45.0 | ±8.0 |
| 0.26 | 0.95 | 45.5 | ±8.5 |

It is understood from Table 7 that when X and Y are in the ranges $0.22 \leq X \leq 0.33$ and $0.60 \leq Y \leq 0.85$, respectively, a smaller recording and erasing magnetic field than the recording and erasing magnetic field (±8 kA/m) of Comparative Example 1 is realized. When X is in the range X<0.22 and X>0.33, it is difficult to realize the perpendicular magnetization state in the recording-temperature region 5. As a result, the auxiliary recording layer 3 is in the in-plane magnetization state, and the effect of decreasing the recording and erasing magnetic field is not produced. When Y is in the range Y<0.60, since the Co content increases, it is difficult to achieve the perpendicular magnetization of the auxiliary recording layer 3 in the recording-temperature region 5. Thus, the effect of decreasing the recording and erasing magnetic field is not produced. Additionally, when Y is in the range Y>0.85, since the Co content decreases, the Curie temperature of the auxiliary recording layer 3 becomes lower, and the magnetization of the auxiliary recording layer 3 becomes smaller. Therefore, it is difficult to retain good magnetostatic coupling between the auxiliary recording layer 3 and the recording layer 1 in the recording-temperature region 5.

Next, the CNR and the recording and erasing magnetic field of a magneto-optical recording medium having the structure of Example 2 and the in-plane magnetization layer 12 represented by $Gd_x(Fe_yCo_{1-y})_{1-x}$ were measured by changing the values of X and Y under the same recording and readout conditions as in Example 1. Table 8 shows the results of the measurements. Here, recording was performed to achieve a maximum CNR by changing the recording power according to each structure. A Curie temperature Tc12 of the in-plane magnetization layer 12 is also shown in Table 8.

TABLE 8

| X | Y | Tc12 (° C.) | CNR (dB) | Recording and erasing magnetic field (kA/m) |
|---|---|---|---|---|
| 0.05 | 0.90 | 250 | 46.0 | ±9.0 |
| 0.06 | 0.90 | 240 | 45.5 | ±7.6 |
| 0.08 | 0.90 | 225 | 46.0 | ±5.5 |
| 0.11 | 0.90 | 220 | 46.0 | ±4.0 |
| 0.13 | 0.90 | 210 | 45.0 | ±6.5 |
| 0.14 | 0.90 | 200 | 45.5 | ±9.5 |
| 0.33 | 0.90 | 165 | 45.0 | ±9.2 |
| 0.36 | 0.90 | 165 | 46.0 | ±7.4 |
| 0.40 | 0.90 | 160 | 46.5 | ±5.5 |
| 0.50 | 0.90 | 155 | 46.0 | ±6.4 |
| 0.70 | 0.90 | 145 | 46.5 | ±7.2 |
| 0.80 | 0.90 | 140 | 46.0 | ±7.9 |
| 0.90 | 0.90 | 130 | 46.0 | ±8.9 |
| 0.11 | 0.84 | 250 | 45.0 | ±9.5 |
| 0.11 | 0.86 | 235 | 45.5 | ±7.5 |
| 0.11 | 0.88 | 225 | 46.5 | ±6.4 |
| 0.11 | 0.90 | 220 | 46.0 | ±4.0 |
| 0.11 | 0.95 | 200 | 46.0 | ±4.8 |
| 0.11 | 1.00 | 200 | 46.5 | ±6.2 |

It is understood from Table 8 that when X and Y are in the ranges $0.06 \leq X \leq 0.13$ or $0.36 \leq X \leq 0.80$ and $0.86 \leq Y \leq 1.00$, respectively, a smaller recording and erasing magnetic field than the recording and erasing magnetic field (±8 kA/m) of Comparative Example 1 is realized. When X is in the range X<0.06, since the Curie temperature of the in-plane magnetization layer 12 becomes higher, the magnetization of the in-plane magnetization layer 12 is present at higher temperatures. It is therefore difficult to realize the perpendicular magnetization state of the auxiliary recording layer 3 in the recording-temperature region 5. As a result, the effect of decreasing the recording and erasing magnetic field is not produced. On the other hand, when X is in the range 0.13<X<0.36, it is difficult to retain the in-plane magnetization state of the in-plane magnetization layer 12, and thus the effect of decreasing the recording and erasing magnetic field is not produced. When X is in the range X>0.80, since the Curie temperature of the in-plane magnetization 12 is lowered, the auxiliary recording layer 3 changes into the perpendicular magnetization state outside of the recording-temperature region 5, i.e., in a region showing no temperature rise. Consequently, the effect of decreasing the recording and erasing magnetic field is not produced. Additionally, when Y is in the range Y <0.86, the Curie temperature of the in-plane magnetization layer 12 becomes higher with an increase in the Co content, and the magnetization of the in-plane magnetization layer 12 is present at higher temperatures. Therefore, it is difficult to realize the perpendicular magnetization state of the auxiliary recording layer 3 in the recording-temperature region 5. As a result, the effect of decreasing the recording and erasing magnetic field is not produced.

It is understood from the Curie temperature (Tc12) of the in-plane magnetization layer 12 shown in Table 8 that if the Curie temperature Tc12 of the in-plane magnetization layer 12 is in a range of from 140 ° C. to 240° C. when the Curie temperature Tc3 of the auxiliary recording layer 3 is 300° C., the effect of decreasing the recording and erasing magnetic field is observed. Namely, the Curie temperature Tc12 of the in-plane magnetization layer 12 needs to satisfy the conditional expression $$\text{Tc3}-160° \text{C.} \leq \text{Tc12} \leq \text{Tc3}-60° \text{C.} \quad \text{(B)}.$$

As the materials for the recording layer 1, it is possible to use materials whose Curie temperature is within a temperature range in the vicinity of the recording temperature. Examples of such materials other than DyFeCo include rare-earth and transition metal alloys, such as TbFeCo, TbDyFeCo, GdTbFeCo and GdDyFeCo, which are currently used for the magneto-optical recording media.

Embodiment 3

The following description will explain Embodiment 3 of the present invention with reference to the drawings. The members having the same function as in the above-mentioned embodiments will be designated by the same code and their description will be omitted.

Figure 6:
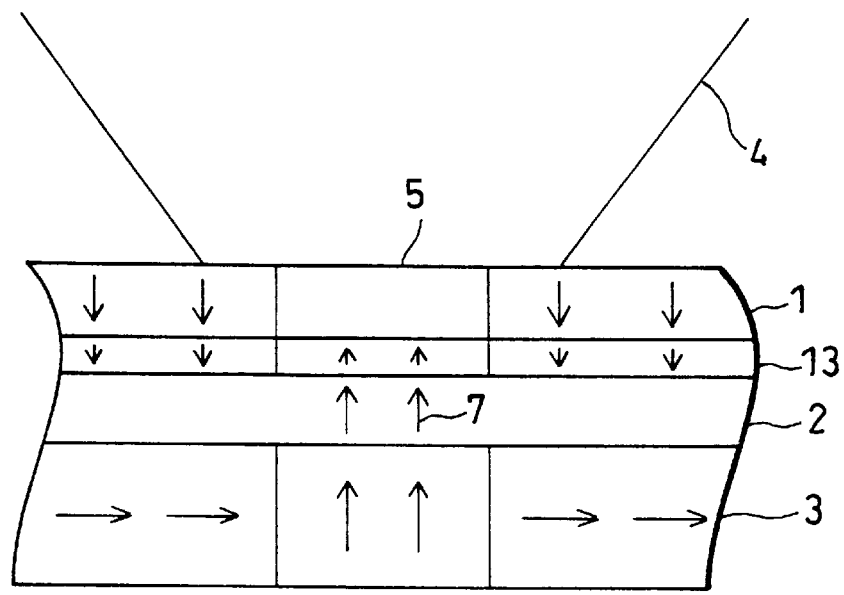
FIG. 6 is an explanatory view showing the principle of recording and reading information on a magneto-optical disk according to Embodiment 3.
Figure 6:
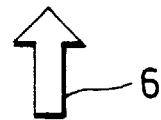

FIG. 6 explains the magnetization state when recording information on a magneto-optical recording medium according to Embodiment 3.

The magneto-optical recording medium of Embodiment 3 includes a recording layer 1, a writing layer 13, a non-magnetic intermediate layer 2, and an auxiliary recording layer 3. The Curie temperature recording method is used as the method of recording information on a magneto-optical disk according to Embodiment 3. In this method, recording is performed by converging the light beam 4 emitted by the semiconductor laser on the recording layer 1 by means of an objective lens, and causing the magnetization direction of the recording layer 1 and writing layer 13 to be parallel to the direction of an external magnetic field in the heated portion.

Here, the recording layer 1 and the writing layer 13 are perpendicular magnetization films having a magnetization in a direction perpendicular to the film surface at temperatures ranging from room temperature to the recording temperature at which recording is performed, including the Curie temperature of the recording layer 1. The writing layer 13 has a Curie temperature higher than that of the recording layer 1, and achieves exchange coupling with the recording layer 1. In a temperature range in the vicinity of the recording temperature, the writing layer 13 has a coercive force smaller than that of the recording layer 1. Therefore, the magnetization of the writing layer 13 is switched at a magnetic field strength lower than a magnetic field strength required for switching the magnetization of the recording layer 1.

The auxiliary recording layer 3 is a magnetic film which has a magnetization in an in-plane direction with respect to the film surface, i.e., an in-plane magnetization state in a portion showing no temperature rise, and changes into a perpendicular magnetization state to have a magnetization in a direction perpendicular to the film surface at the recording temperature.

The recording layer 1 and the writing layer 13 are heated to the recording temperature by the converged laser beam 4. Here, the Curie temperature of the writing layer 13 is set to a temperature higher than the Curie temperature of the recording layer 1, and the magnetic properties of the readout layer are set so that the magnetization thereof is easily switched by an external magnetic field to be applied. Therefore, in the recording-temperature region 5 heated to the recording temperature, the magnetization of the recording layer 1 disappears, while the magnetization of the writing layer 13 whose magnetization is easily switchable is present. At this time, by applying the external magnetic field which has been modulated according to information, the magnetization direction of the writing layer 13 becomes parallel to the direction of the external magnetic field. Then, the magnetization direction of the recording layer 1 is aligned with the magnetization of the writing layer 13 by the exchange coupling force, and thus recording is carried out.

In Embodiment 3, the auxiliary recording layer 3 is in the in-plane magnetization state outside of the recording-temperature region 5, and in the perpendicular magnetization state in the recording-temperature region 5. Therefore, a leakage magnetic field from the auxiliary recording layer 3 is not present outside of the recording-temperature region 5, while the leakage magnetic field 7 from the auxiliary recording layer 3 is present in the recording-temperature region 5. At this time, since the magnetization direction of the auxiliary recording layer 3 becomes parallel to the direction of the external magnetic field 6, the leakage magnetic field 7 from the auxiliary recording layer 3 also becomes parallel to the external magnetic field 6. The external magnetic field 6 and the leakage magnetic field 7 from the auxiliary recording layer 3 affect the writing layer 13. At this time, the magnetization of the writing layer 13 is switched at a lower magnetic field strength compared to the recording layer 1 as described above. It is thus possible to record information by an external magnetic field smaller than the external magnetic fields of Embodiments 1 and 2.

Embodiment 3 explains an example in which a magneto-optical disk is used as the magneto-optical recording medium.

Figure 7:
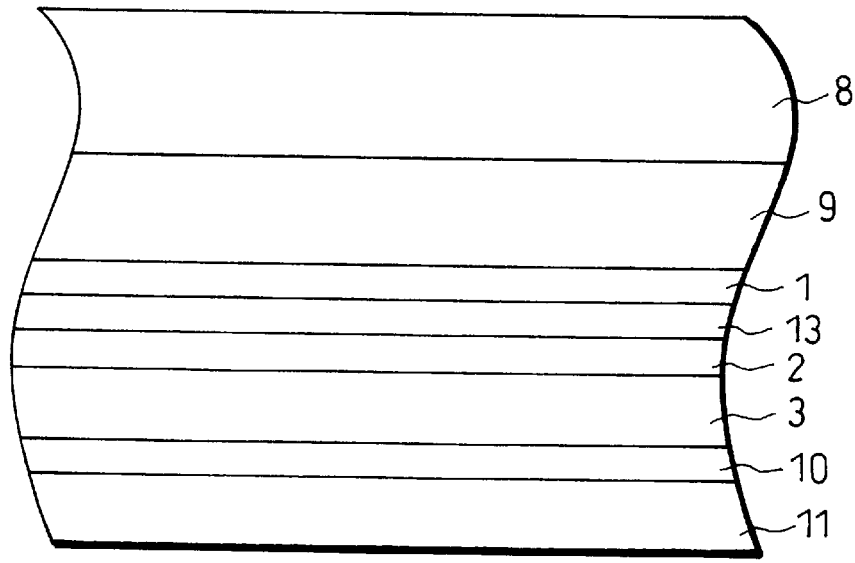
FIG. 7 is an explanatory view showing the film structure of the magneto-optical disk of Embodiment 3.

As illustrated in FIG. 7, the magneto-optical disk according to Embodiment 3 includes a disk main body formed by layering the substrate 8, transparent dielectric layer 9, recording layer 1, writing layer 13, non-magnetic intermediate layer 2, auxiliary recording layer 3, protective layer 10, and overcoat layer 11 in this order.

The substrate 8, transparent dielectric layer 9, recording layer 1, non-magnetic intermediate layer 2, auxiliary recording layer 3, protective layer 10, and overcoat layer 11 are formed in the same manner as in Embodiment 1.

The writing layer 13 of Embodiment 3 is arranged to achieve exchange coupling with the recording layer 1. In order to improve the sensitivity of the recording layer 1 to the magnetic field, it is preferred that the Curie temperature of the writing layer 13 is higher than the Curie temperature of the recording layer 1 and the thickness thereof is in a range of from 5 nm to 60 nm.

The following description will explain a specific example of the magneto-optical disk according to this embodiment by separately describing (1) the fabrication process of the magneto-optical disk and (2) the recording and readout characteristics.

(1) Fabrication Process of the Magneto-Optical Disk

First, a polycarbonate substrate 8 formed in a disk shape with a pregroove and prepits was placed on a substrate holder in a sputtering device provided with an Al target, a DyFeCo alloy target and two kinds of GdFeCo alloy targets corresponding to the writing layer 13 and the auxiliary recording layer 3. Then, a 80-nm-thick transparent dielectric layer 9 made of AlN, a 15-nm-thick recording layer 1 made of $Dy_{0.25}(Fe_{0.75}Co_{0.25})_{0.75}$, a 10-nm-thick writing layer 13 made of $Gd_{0.25}(Fe_{0.75}Co_{0.25})_{0.75}$, a 20-nm-thick non-magnetic intermediate layer 2 made of AlN, a 60-nm-thick auxiliary recording layer made of $Gd_{0.31}(Fe_{0.70}Co_{0.30})_{0.69}$, a 20-nm-thick protective layer 10 made of AlN, and an overcoat layer 11 were formed in the same manner as in Embodiment 1. Here, in order to achieve exchange coupling between the writing layer 13 and the recording layer 1, the 10-nm-thick writing layer 13 made of $Gd_{0.25}(Fe_{0.75}Co_{0.25})_{0.75}$ was formed by supplying power to the GdFeCo alloy target corresponding to the writing layer 13 under a gas pressure of $4\times10^{-3}$ Torr successively after the formation of the readout layer 1. The writing layer 13 is a perpendicular magnetization film which has a magnetization in a direction perpendicular to the film surface up to its Curie temperature. The Curie temperature was 220° C.

(2) Recording and Readout Characteristics

The above-mentioned magneto-optical disk was measured to find the dependence of the CNR (carrier to noise ratio) on the recording magnetic field with an optical pickup using the semiconductor laser having a wavelength of 680 nm. The results of the measurement is shown as Example 3 in FIG. 8. A conventional magneto-optical recording medium having a 40-nm-thick Al reflective layer instead of the auxiliary recording layer 3 was measured to find the dependance of the CNR on the recording magnetic field for comparison purposes. The result of the measurement is shown as Comparative Example 3 in FIG. 3. The dependence of the CNR on the recording magnetic field shown in FIG. 3 indicates the results of the measurements carried out under the conditions of a track pitch of 1.1 μm, a recording magnetic domain pitch of 1.2 μm, a recording power of 6.5 mW, and a read power of 1.5 mW.

Figure 8:
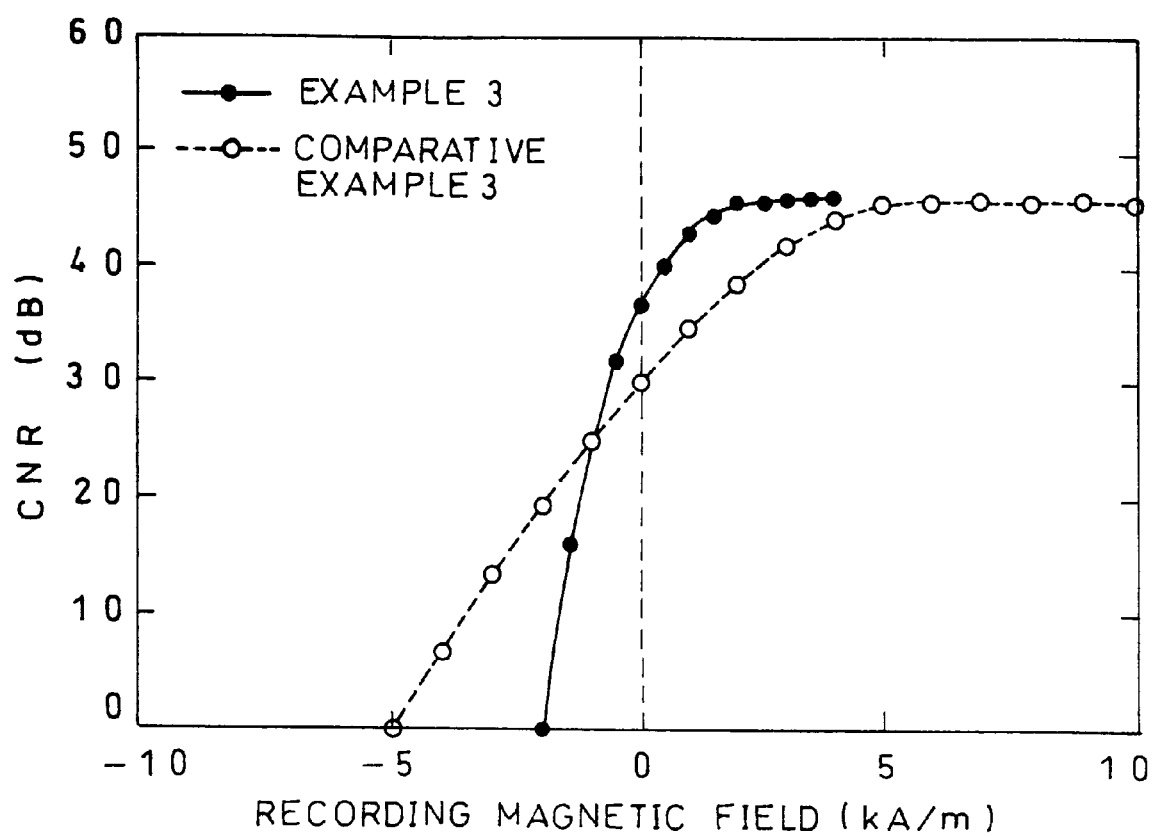
FIG. 8 is a graph showing the recording and readout characteristics of the magneto-optical disk of Embodiment 3.

As shown in FIG. 8, in Comparative Example 3, when the recording magnetic field was −5.0 kA/m, the CNR was zero. Thus, it is understood that erasing is executable by a magnetic field of −5.0 kA/m. Moreover, the CNR was saturated when the recording magnetic field was 5.0 kA/m. Therefore, recording is executable by a magnetic field of 5.0 kA/m. The light beam of a uniform intensity was applied to this disk, and magnetic-field modulation recording was performed with a recording magnetic field which was modulated according to information. The recording was executable at a modulated magnetic field strength of 5.0 kA/m.

On the other hand, in the magneto-optical disk of Example 3, when the recording magnetic field was −2.0 kA/m, the CNR was zero. Thus, erasing is executable by a magnetic field of −2.0 kA/m. In addition, the CNR was saturated when the recording magnetic field was 2.0 kA/m. Therefore, it is understood that recording is executable by a magnetic field of 2.0 kA/m. The light beam of a uniform intensity was applied to this disk, and magnetic-field modulation recording was performed with a recording magnetic field which was modulated according to information. The recording was executable at a modulated magnetic field strength of 2.0 kA/m.

In short, the conventional magneto-optical disk of Comparative Example 3 required a recording and erasing magnetic field of ±5.0 kA/m. In contrast, it was confirmed that a recording and erasing magnetic field of ±2.0 kA/m was sufficient for the magneto-optical disk of Example 3.

Next, the thicknesses of the recording layer 1 and the writing layer 13 of Example 3 were varied, and the CNR and the recording and erasing magnetic field were measured under the same recording and readout conditions as in Example 3. The results of the measurements are shown in Table 9. For the measurements of the CNR, recording was performed to achieve a maximum CNR by changing the recording power according to the thicknesses of the recording layer 1 and writing layer 13.

TABLE 9

| Thickness of recording layer (nm) | Thickness of writing layer (nm) | CNR (dB) | Recording and erasing magnetic field (kA/m) |
|---|---|---|---|
| 5 | 10 | 32.0 | ±1.9 |
| 10 | 10 | 44.5 | ±2.0 |
| 15 | 10 | 46.0 | ±2.0 |
| 20 | 10 | 46.0 | ±2.2 |
| 30 | 10 | 45.5 | ±3.2 |
| 40 | 10 | 43.0 | ±3.8 |
| 60 | 10 | 43.5 | ±4.3 |
| 80 | 10 | 43.0 | ±4.8 |
| 100 | 10 | 43.0 | ±5.3 |
| 15 | 3 | 45.5 | ±5.0 |
| 15 | 5 | 45.0 | ±3.2 |
| 15 | 10 | 46.0 | ±2.0 |
| 15 | 15 | 46.0 | ±2.0 |
| 15 | 20 | 45.5 | ±2.8 |
| 15 | 25 | 45.0 | ±3.5 |
| 15 | 30 | 43.5 | ±3.9 |
| 15 | 40 | 43.0 | ±4.2 |
| 15 | 60 | 43.0 | ±4.5 |
| 15 | 80 | 43.0 | ±4.8 |
| 15 | 100 | 43.0 | ±5.8 |

It is understood that, when the thickness of the recording layer 1 was increased to 100 nm, the recording and erasing magnetic field of Example 3 was increased to ±5.3 kA/m and exceeded the recording and erasing magnetic field (±5.0 kA/m) of Comparative Example 3 due to an increase in the demagnetizing field in the recording layer 1. It is thus necessary for the recording layer 1 to have a thickness of not more than 80 nm. In addition, when the thickness of the recording layer 1 was reduced to 5 nm, the CNR was significantly lowered to 32.0 dB because the recording layer 1 was too thin, and therefore the readout of signals from the magneto-optical disk became difficult. For the reasons mentioned above, the thickness of the recording layer 1 needs to be in a range of from 10 nm to 80 nm. Moreover, it is understood that, when the thickness of the writing layer 13 was increased to 100 nm, the recording and erasing magnetic field of Example 3 was increased to ±5.8 kA/m and exceeded the recording and erasing magnetic field (±5.0 kA/m) of Comparative Example 3 due to an increase in the demagnetizing field in the writing layer 13. It is thus necessary for the writing layer 13 to have a thickness of not more than 80 nm. In addition, when the thickness of the writing layer 13 was reduced to 3 nm, the effect of decreasing the recording and erasing magnetic field by the writing layer 13 was not produced because the writing layer 13 was too thin. Therefore, a recording and erasing magnetic field of ±5.0 kA/m was required like Comparative Example 3. For the reasons mentioned above, the thickness of the writing layer 13 needs to be in a range of from 5 nm to 80 nm. Furthermore, in order to achieve a high CNR by the use of the optical interference effect produced by the multiple reflection between the recording layer 1 and writing layer 13 and the auxiliary recording layer 3, it is preferred to arrange the total thickness of the recording layer 1 and the writing layer 13 to be in a range of from 20 nm to 40 nm.

Regarding the thicknesses of the in-plane magnetization layer 2 and auxiliary recording layer 3, the thickness of the in-plane magnetization layer 2 needs to be in a range of from 1 nm to 80 nm, and the thickness of the auxiliary recording layer 3 needs to be in a range of from 10 nm to 200 nm like Example 1.

Example 3 shows the results of measuring the magneto-optical disk having the recording layer 1 made of $Dy_{0.25}$ $(Fe_{0.75}Co_{0.25})_{0.75}$, the writing layer 13 made of $Gd_{0.25}$ $(Fe_{0.75}Co_{0.25})_{0.75}$, and the auxiliary recording layer 3 made of $Gd_{0.31}(Fe_{0.70}Co_{0.30})_{0.69}$. However, a similar decrease in the recording and erasing magnetic field can be achieved by compositions and materials other than those mentioned above.

The CNR and the recording and erasing magnetic field of a magneto-optical recording medium having the structure of Example 3 and the writing layer 13 represented by $Gd_x$ $(Fe_yCo_{1-y})_{1-x}$ were measured by changing the values of X and Y under the same recording and readout conditions as in Example 3. Table 10 shows the results of the measurements. Here, recording was performed to achieve a maximum CNR by changing the recording power according to each structure. A Curie temperature Tc13 of the writing layer 13 is also shown in Table 10.

TABLE 10

| X | Y | Tc13 (° C.) | CNR (dB) | Recording and erasing magnetic field (kA/m) |
|---|---|---|---|---|
| 0.17 | 0.75 | 345 | 39.0 | ±5.5 |
| 0.19 | 0.75 | 340 | 45.0 | ±4.1 |
| 0.21 | 0.75 | 335 | 46.0 | ±2.8 |
| 0.23 | 0.75 | 325 | 46.5 | ±2.4 |
| 0.25 | 0.75 | 320 | 46.0 | ±2.0 |
| 0.27 | 0.75 | 310 | 46.0 | ±3.9 |
| 0.29 | 0.75 | 305 | 45.0 | ±5.0 |
| 0.25 | 0.55 | 365 | 35.0 | ±6.0 |
| 0.25 | 0.60 | 350 | 41.5 | ±4.7 |
| 0.25 | 0.65 | 345 | 46.5 | ±3.4 |
| 0.25 | 0.70 | 330 | 46.0 | ±2.4 |
| 0.25 | 0.75 | 320 | 46.0 | ±2.0 |
| 0.25 | 0.80 | 300 | 45.5 | ±3.7 |
| 0.25 | 0.85 | 240 | 46.0 | ±5.0 |
| 0.25 | 0.90 | 210 | 45.5 | ±5.0 |

It is understood from Table 10 that when X and Y were in the ranges $0.19 \leq X \leq 0.27$ and $0.60 \leq Y \leq 0.80$, respectively, a smaller recording and erasing magnetic field than the recording and erasing magnetic field (±5 kA/m) of Comparative Example 3 was realized. When X was in the range X<0.19, it was difficult to retain the perpendicular magnetization state in the writing layer 13 because of a decrease in the Gd content of the writing layer 13. Consequently, the CNR deteriorated, and the recording and erasing magnetic field increased. When X was in the range X>0.27, the magnetization of the writing layer 13 was decreased in a temperature range corresponding to the recording-temperature region 5 because of an increase in the Gd content of the writing layer 13. Thus, it was difficult to retain good magnetostatic coupling between the writing layer 13 and the auxiliary recording layer 3, and the recording and erasing magnetic field became the same as that of Comparative Example 3 (±5 kA/m). When Y was in the range Y<0.60, since the Co content increased, it was difficult to achieve the perpendicular magnetization state in the writing layer 13. Consequently, the CNR deteriorated, and the recording and erasing magnetic field increased. Additionally, when Y was in the range Y>0.80, since the Co content decreased, the Curie temperature of the writing layer 13 became lower than the Curie temperature of the recording layer 1. Therefore, it was difficult to produce the effect of improving the recording characteristics of the recording layer 1 by the writing layer 13, and the recording and erasing magnetic field became the same as that of Comparative Example 3 (±5 kA/m).

As the materials for the recording layer 1 other than DyFeCo, it is possible to use rare-earth and transition metal alloys, such as TbFeCo, TbDyFeCo, GdTbFeCo and GdDyFeCo, which are currently used for the magneto-optical recording media.

Regarding the materials for the auxiliary recording layer 3, it is possible to use a GdFeCo alloy like Example 1.

Embodiment 4

The following description will explain Embodiment 4 of the present invention in detail with reference to the drawings. The members having the same function as in the above-mentioned embodiment will be designated by the same code and their description will be omitted.

Figure 9:
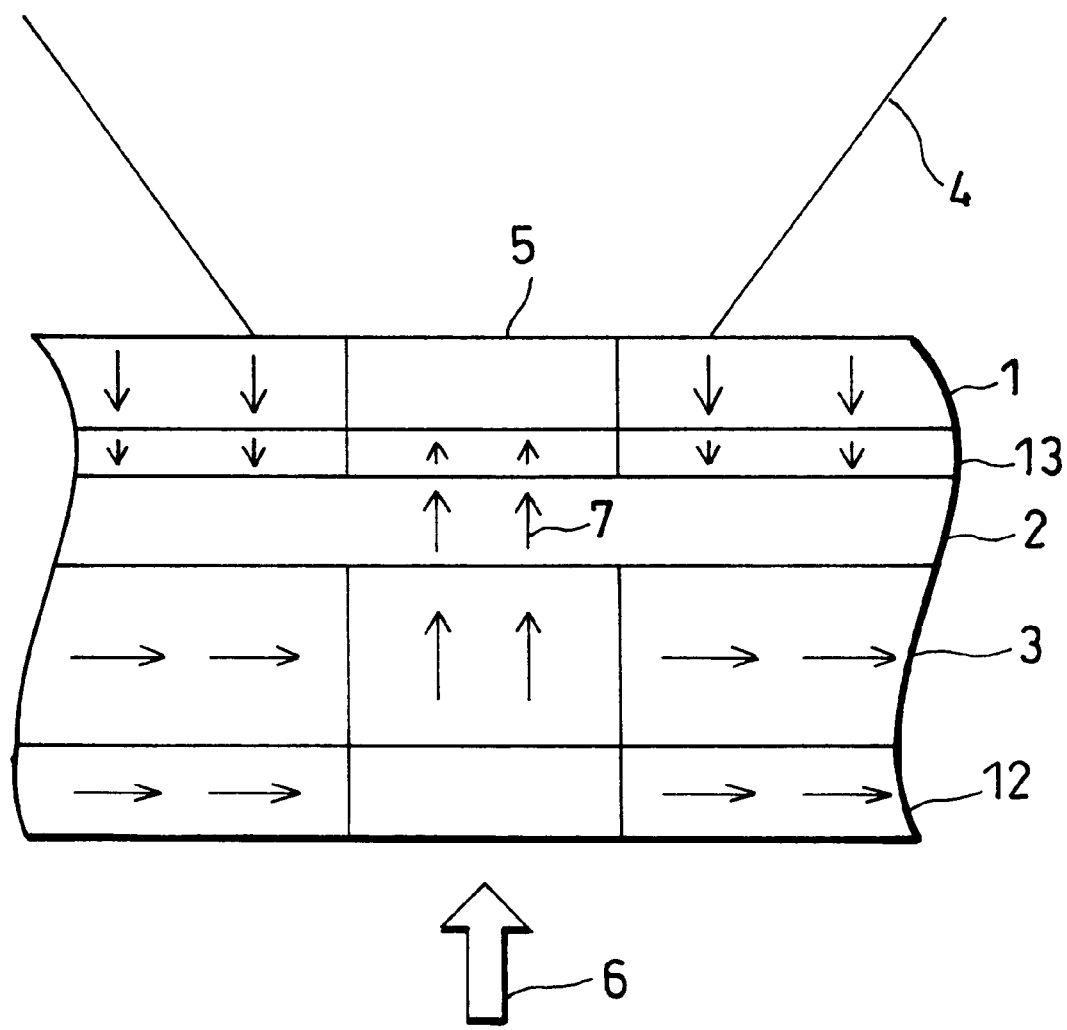
FIG. 9 is an explanatory view showing the principle of recording and reading information on a magneto-optical disk according to Embodiment 4.

FIG. 9 explains the magnetization state when recording information on a magneto-optical recording medium according to Embodiment 4.

The magneto-optical recording medium of Embodiment 4 includes a recording layer 1, a writing layer 13, a non-magnetic intermediate layer 2, an auxiliary recording layer 3, and an in-plane magnetization layer 12. The Curie temperature recording method is used as the method of recording information on a magnet-optical disk according to Embodiment 4. In this method, recording is performed by converging the light beam 4 emitted by the semiconductor laser on the recording layer 1 by means of an objective lens, and causing the magnetization direction of the recording layer 1 and writing layer 13 to be parallel to the direction of an external magnetic field in the heated portion.

Here, the recording layer 1 and writing layer 13 are perpendicular magnetization films having a magnetization in a direction perpendicular to the film surface at temperatures ranging from room temperature to the recording temperature at which recording is performed. The in-plane magnetization layer 12 achieves exchange coupling with the auxiliary recording layer 3, and its Curie temperature is set so that no magnetization is present at the recording temperature. By achieving exchange coupling between the auxiliary recording layer 3 and the in-plane magnetization layer 12, the auxiliary recording layer 3 realizes such properties that the auxiliary recording layer 3 has a magnetization in an in-plane direction with respect to the film surface, i.e., the in-plane magnetization state, in a portion showing no temperature rise, and a magnetization in a direction perpendicular to the film surface, i.e., the perpendicular magnetization state, at the recording temperature.

The recording layer 1 and writing layer 13 are heated to the recording temperature by the converged light beam 4. Here, the Curie temperature of the writing layer 13 is set higher than the Curie temperature of the recording layer 1, and the magnetic properties thereof are set so that the magnetization direction is easily switched by an external magnetic field to be applied. Therefore, in the recording-temperature region 5 heated to the recording temperature, the magnetization of the recording layer 1 disappears, while the magnetization of the writing layer 13 whose magnetization is easily switchable is present. At this time, by applying the external magnetic field, the magnetization direction of the writing layer 13 becomes parallel to the direction of the external magnetic field. As a result, the magnetization direction of the recording layer 1 is aligned with the magnetization of the writing layer 13, thereby achieving recording.

In Embodiment 4, the auxiliary recording layer 3 and the in-plane magnetization layer 12 achieve exchange coupling. The exchange coupling prevents the magnetization direction from switching to a direction oblique to the film surface in the vicinity of the recording-temperature region 5. Therefore, the auxiliary recording layer 3 realizes such properties that the auxiliary recording layer 3 is certainly in the in-plane magnetization state outside of the recording-temperature region 5, and in the perpendicular magnetization state in the recording-temperature region 5. Consequently, a leakage magnetic field from the auxiliary recording layer 3 is not present outside of the recording-temperature region 5, while the leakage magnetic field 7 from the auxiliary recording layer 3 is present in the recording-temperature region 5. At this time, since the magnetization direction of the auxiliary recording layer 3 becomes parallel to the direction of the external magnetic field 6, the leakage magnetic field 7 from the auxiliary recording layer 3 also becomes parallel to the external magnetic field 6. The external magnetic field 6 and the leakage magnetic field 7 from the auxiliary recording layer 3 affect the writing layer 13. At this time, the magnetization of the writing layer 13 is switched by a smaller magnetic field compared to the recording layer 1, and the magnetization direction of the recording layer 1 is determined by the magnetization thus switched. It is therefore possible to perform recording on the recording layer 1 by a smaller external magnetic field.

Embodiment 4 explains an example in which a magneto-optical disk is used as the magneto-optical recording medium.

Figure 10:
FIG. 10 is an explanatory view showing the film structure of the magneto-optical disk of Embodiment 4.

As illustrated in FIG. 10, the magneto-optical disk according to Embodiment 4 includes a disk main body formed by layering the substrate 8, transparent dielectric layer 9, recording layer 1, writing layer 13, non-magnetic intermediate layer 2, auxiliary recording layer 3, in-plane magnetization layer 12, protective layer 10, and overcoat layer 11 in this order.

The substrate 8, transparent dielectric layer 9, recording layer 1, writing layer 13, non-magnetic intermediate layer 2, auxiliary recording layer 3, in-plane magnetization layer 12, protective layer 10, and overcoat layer 11 are formed in the same manner as in Embodiments 1, 2 and 3.

The following description will explain a specific example of the magneto-optical disk of this embodiment by separately describing (1) the fabrication process of the magneto-optical disk and (2) the recording and readout characteristics.

(1) Fabrication Process of the Magneto-Optical Disk

First, a polycarbonate substrate 8 formed in a disk shape with a pregroove and prepits was placed on a substrate holder in a sputtering device provided with an Al target, a DyFeCo alloy target and three kinds of GdFeCo alloy targets corresponding to the writing layer 13, the auxiliary recording layer 3 and the in-plane magnetization layer 12. Then, a 80-nm-thick transparent dielectric layer 9 made of AlN, a 15-nm-thick recording layer 1 made of $Dy_{0.25}(Fe_{0.75}Co_{0.25})_{0.75}$, a 10-nm-thick writing layer 13 made of $Gd_{0.25}(Fe_{0.75}Co_{0.25})_{0.75}$, a 20-nm-thick non-magnetic intermediate layer 2 made of AlN, a 40-nm-thick auxiliary recording layer 3 made of $Gd_{0.26}(Fe_{0.80}Co_{0.20})_{0.74}$, a 20-nm-thick in-plane magnetization layer 12 made of $Gd_{0.11}(Fe_{0.90}Co_{0.10})_{0.89}$, a 20-nm-thick protective layer 10 made of AlN, and an overcoat layer 11 were formed in the same manner as in Embodiments 1, 2 and 3.

(2) Recording and Readout Characteristics

The above-mentioned magneto-optical disk was measured to find the dependence of the CNR (carrier to noise ratio) on the recording magnetic field with an optical pickup using the semiconductor laser having a wavelength of 680 nm. As a result, properties similar to those of Example 3 shown in FIG. 8 were found. Specifically, it was confirmed that the magneto-optical disk of Embodiment 4 achieved a CNR of 46 dB, and recording and erasing with a recording and erasing magnetic field of ±2.0 kA/m.

Like Embodiment 3, in Embodiment 4, the thickness of the recording layer 1 needs to be in a range of from 10 nm to 80 nm, and the thickness of the writing layer 13 needs to be in a range of from 5 nm to 80 nm. Additionally, in order to achieve a high CNR by the use of the optical interference effect produced by the multiple reflection between the recording layer 1 and writing layer 13 and the auxiliary recording layer 3, it is preferred to arrange the total thickness of the recording layer 1 and the writing layer 13 to be in a range of from 20 nm to 40 nm. Moreover, like Embodiment 2, the thickness of the non-magnetic intermediate layer 2 is preferably in a range of from 1 nm to 80 nm. Furthermore, like Embodiment 2, the thickness of the auxiliary recording layer 3 needs to be in a range of from 10 nm to 120 nm, and the thickness of the in-plane magnetization layer 12 needs to be in a range of from 5 nm to 150 nm.

Embodiment 4 shows the results of measuring the magneto-optical disk having the recording layer 1 made of $Dy_{0.25}(Fe_{0.75}Co_{0.25})_{0.75}$, the writing layer 13 made of $Gd_{0.25}(Fe_{0.75}Co_{0.25})_{0.75}$, the auxiliary recording layer 3 made of $Gd_{0.26}(Fe_{0.80}Co_{0.20})_{0.74}$, and the in-plane magnetization layer 12 made of $Gd_{0.11}(Fe_{0.90}Co_{0.10})_{0.89}$. However, a similar decrease in the recording and erasing magnetic field can be achieved by compositions and materials other than those mentioned above. In short, it is possible to use rare-earth and transition metal alloys having the same compositions as those of the recording layer 1, auxiliary recording layer 3 and in-plane magnetization layer 12 of Embodiment 2, and the recording layer 1, writing layer 13 and auxiliary recording layer 3 of Embodiment 3.

Embodiment 5

The auxiliary recording layer 3 and the in-plane magnetization layer 12 of the present invention can also decrease the recording and erasing magnetic field on a super resolution magneto-optical recording medium having the recording layer 1 and the readout layer 14. Referring to the drawings, the following description will explain in detail Embodiment 5 in which the present invention is adopted into a super resolution magneto-optical recording medium. The members having the same function as in the above-mentioned embodiment will be designated by the same code and their description will be omitted.

Figure 11:
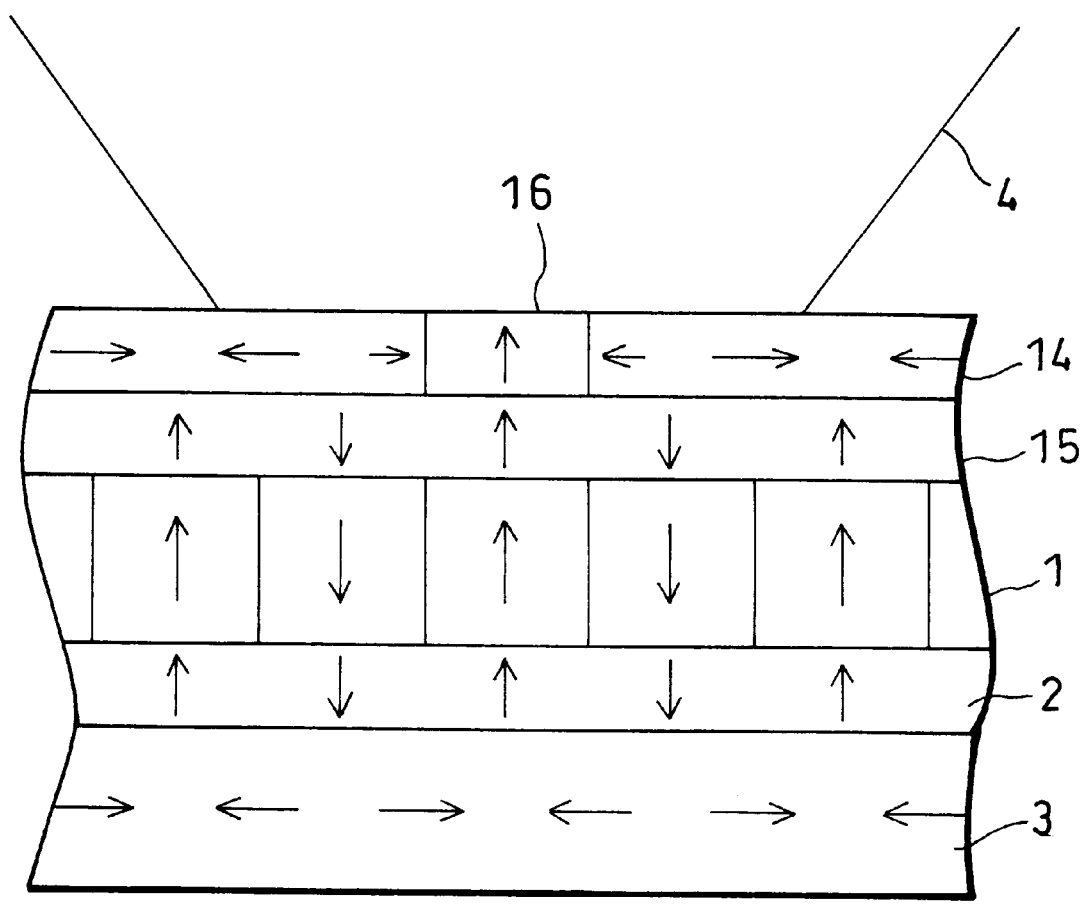
FIG. 11 is an explanatory view showing the principle of reading information on a super resolution magneto-optical disk according to Embodiment 5.
Figure 12:
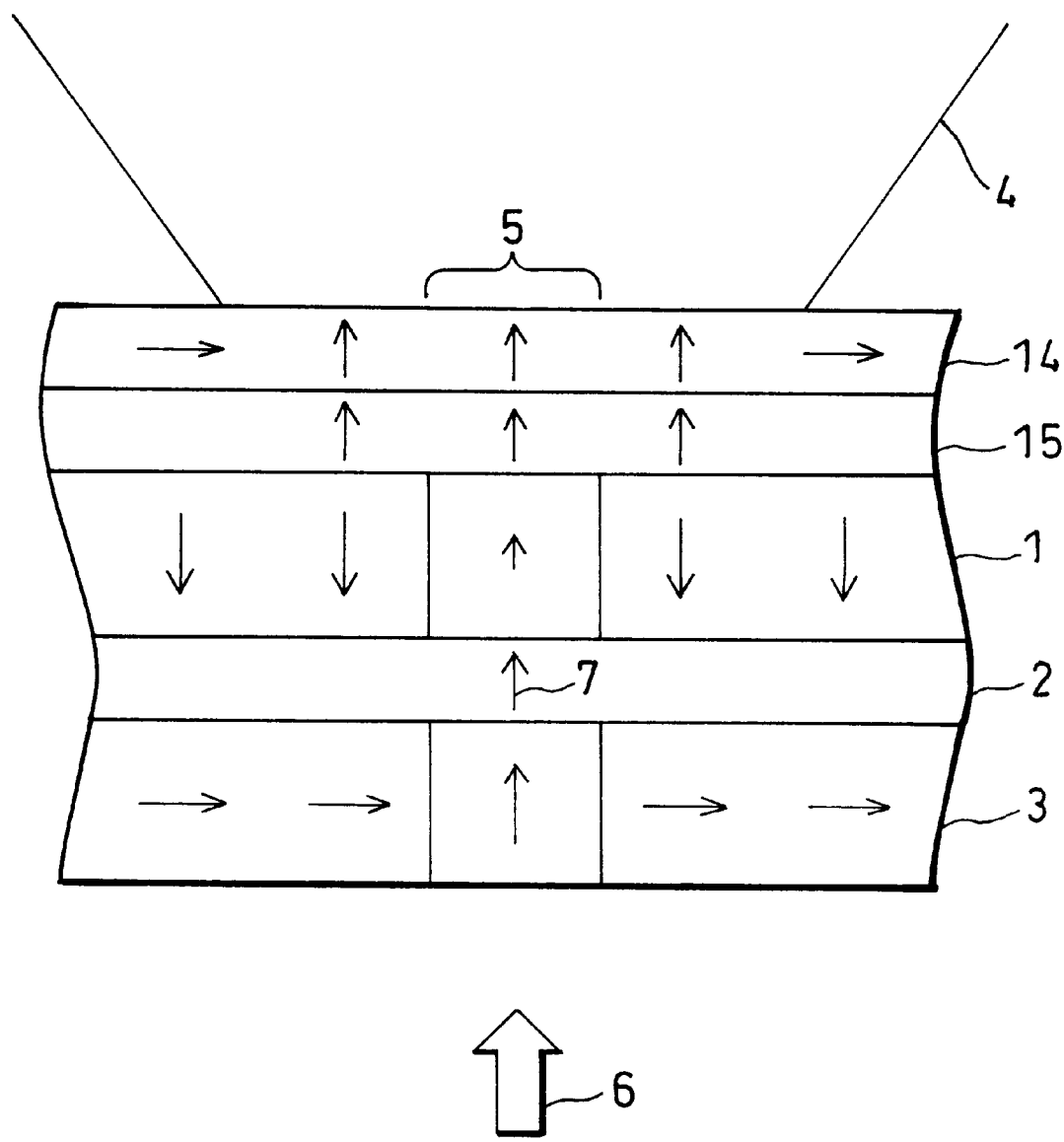
FIG. 12 is an explanatory view showing the principle of recording information on the super resolution magneto-optical disk of Embodiment 5.

FIGS. 11 and 12 explain the magnetization state when recording and reading information on a super resolution magneto-optical recording medium having a readout layer 14 which is in the in-plane magnetization state at room temperature and changes into the perpendicular magnetization state at a readout temperature, a recording layer 1 which is a perpendicular magnetization film, and an auxiliary recording layer 3 which is in the in-plane magnetization state at room temperature and changes into the perpendicular magnetization state at the recording temperature, wherein the readout layer 14, recording layer 1 and auxiliary recording layer 3 achieve magnetostatic coupling. In order to achieve magnetostatic coupling between the readout layer 14 and the recording layer 1, a non-magnetic intermediate layer 15 is provided. Moreover, in order to achieve magnetostatic coupling between the recording layer 1 and the auxiliary recording layer 3, a non-magnetic intermediate layer 2 is provided.

In a magneto-optical disk according to Embodiment 5, readout of a signal is performed by the use of the polar Kerr effect. As illustrated in FIG. 11, the light beam 4 emitted by the semiconductor laser is converged on the readout layer 14 by means of an objective lens to bring the readout layer 14 into the perpendicular magnetization state. The information on the recording layer 1 is transferred to the readout layer 14 and read out only from this portion, i.e., a readout-temperature region 16 heated to the readout temperature. In a portion where the readout layer 14 is in the in-plane magnetization state, the information on the recording layer 1 is masked by the in-plane magnetization of the readout layer 14, and thus a readout-temperature region 16 smaller than the spot of the converged light beam 4 is formed. Thus, super resolution magnetic readout is realized.

In the readout-temperature region 16, since the auxiliary recording layer 3 is in the in-plane magnetization state, the in-plane magnetization film which achieves magnetostatic coupling is present on a side of the recording layer 1 opposite to the readout layer 14. By providing such an auxiliary recording layer 3, a leakage magnetic field from the recording layer 1 is efficiently confined, and the effect of the leakage magnetic field on the readout layer 14 is enhanced. It is therefore possible to improve the quality of readout signals.

The Curie temperature recording method is used as the method of recording information. In this method, as shown in FIG. 12, recording is carried out by converging the light beam 4 emitted by the semiconductor laser on the readout layer 14 and recording layer 1 by means of the objective lens, and causing the magnetization direction of the recording layer 1 to be parallel to the direction of the external magnetic field 6 in the heated portion.

Here, the recording layer 1 is a perpendicular magnetization film having a magnetization in a direction perpendicular to the film surface at temperatures ranging from room temperature to the recording temperature at which recording is performed. The auxiliary recording layer 3 is a magnetic film which has a magnetization in an in-plane direction with respect to the film surface, i.e., the in-plane magnetization state, in a portion showing no temperature rise, and a magnetization in a direction perpendicular to the film surface, i.e., the perpendicular magnetization state, at the recording temperature.

The recording layer 1 is heated to the recording temperature by the converged laser light 4. In the recording-temperature region 5 heated to the recording temperature, the coercive force of the recording layer 1 decreases, and the magnetization direction of the recording layer 1 is made parallel to the direction of an external magnetic field to be applied. As a result, recording is carried out.

In Embodiment 5, the auxiliary recording layer 3 is in the in-plane magnetization state outside of the recording-temperature region 5, and in the perpendicular magnetization state in the recording-temperature region 5. Consequently, a leakage magnetic field from the auxiliary recording layer 3 is not present outside of the recording-temperature region 5, while the leakage magnetic field 7 from the auxiliary recording layer 3 is present in the recording-temperature region 5. At this time, since the magnetization direction of the auxiliary recording layer 3 becomes parallel to the direction of the external magnetic field 6, the leakage magnetic field 7 from the auxiliary recording layer 3 also becomes parallel to the external magnetic field 6. Since the external magnetic field 6 and the leakage magnetic field 7 from the auxiliary recording layer 3 function as the external magnetic field, it is possible to perform recording on the recording layer 1 with a smaller external magnetic field.

The readout layer 14 is in the perpendicular magnetization state in the recording-temperature region 5. However, since the recording layer 1 is heated to a temperature in the vicinity of the Curie temperature, a magnetostatic coupling force exerted on the readout layer 14 from the recording layer 1 is very small. Consequently, in the recording-temperature region 5, the magnetization direction of the readout layer 14 also becomes the same as the direction of the external magnetic field 6. Therefore, the readout layer 14 works so as to assist the recording by the external magnetic field 6 like the leakage magnetic field 7.

Embodiment 5 explains an example in which a magneto-optical disk is used as the magneto-optical recording medium.

Figure 13:
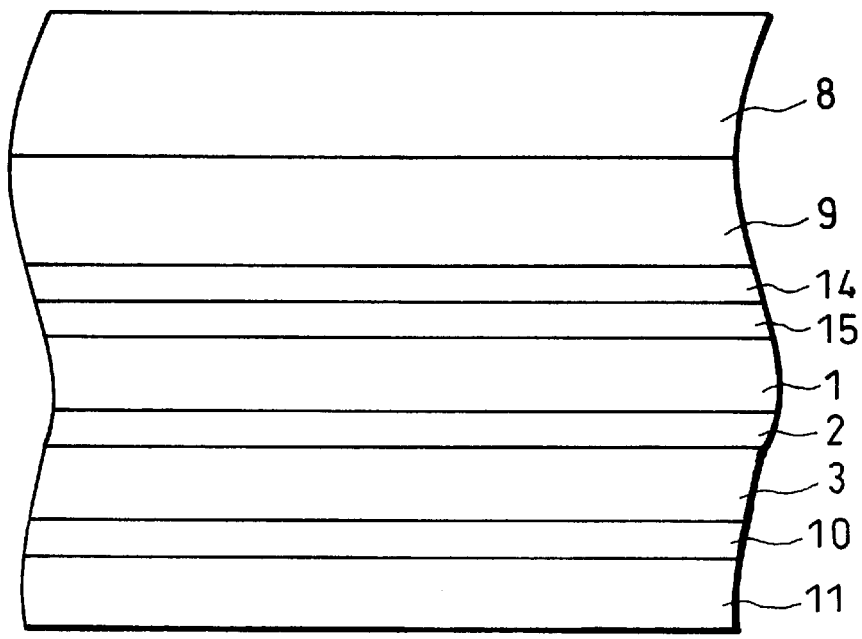
FIG. 13 is an explanatory view showing the film structure of the super resolution magneto-optical disk of Embodiment 5.

As illustrated in FIG. 13, the magneto-optical disk according to Embodiment 5 includes a disk main body formed by layering the substrate 8, transparent dielectric layer 9, readout layer 14, non-magnetic intermediate layer 15, recording layer 1, non-magnetic intermediate layer 2, auxiliary recording layer 3, protective layer 10, and overcoat layer 11 in this order.

The substrate 8, transparent dielectric layer 9, non-magnetic intermediate layer 2, auxiliary recording layer 3, protective layer 10, and overcoat layer 11 are formed in the same manner as in Embodiment 1.

The readout layer 14 is a magnetic film made a rare-earth and transition metal alloy, and its composition is adjusted so as to have such magnetic properties that the readout layer 14 is in the in-plane magnetization state at room temperature and changes into the perpendicular magnetization state at the readout temperature.

The non-magnetic intermediate layer 15 is made of a dielectric material such as AlN, SiN and AlSiN, or a non-magnetic metal alloy such as Al, Ti and Ta. The thickness of the non-magnetic intermediate layer 15 is arranged to be within a range of from 1 nm to 80 nm so as to achieve magnetostatic coupling between the readout layer 14 and the recording layer 1.

The recording layer 1 is a perpendicular magnetization film made of a rare-earth and transition metal alloy, and its thickness is set within a range of from 10 nm to 80 nm like Example 1 so as to achieve good magnetostatic coupling with the auxiliary recording layer 3.

The following description will explain a specific example of the magneto-optical disk of this embodiment by separately describing (1) the fabrication process of the magneto-optical disk and (2) the recording and readout characteristics.

(1) Fabrication Process of the Magneto-Optical Disk

First, a polycarbonate substrate 8 formed in a disk shape with a pregroove and prepits was placed on a substrate holder in a sputtering device provided with an Al target, a GdDyFeCo alloy target and two kinds of GdFeCo alloy targets corresponding to the readout layer 14 and the auxiliary recording layer 3. Then, the inside of the sputtering device was evacuated to $1\times10^{-6}$ Torr to be filled with a mixed gas of argon and nitrogen. Then, power was supplied to the Al target under a gas pressure of $4\times10^{-3}$ Torr so as to form an 80-nm-thick transparent dielectric layer 9 made of AlN on the substrate 8.

Next, the inside of the sputtering device was evacuated again to $1\times10^{-6}$ Torr to be filled with an argon gas. Then, power was supplied to the GdDyFeCo alloy target corresponding to the readout layer 14 under a gas pressure of $4\times10^{-3}$ Torr so as to form a 20-nm-thick readout layer 14 made of $Gd_{0.30}(Fe_{0.82}Co_{0.18})_{0.70}$ on the transparent dielectric layer 9. The readout layer 14 had a magnetization in an in-plane direction with respect to the film surface, i.e., the in-plane magnetization state, up to 100° C., and a magnetization in a direction perpendicular to the film surface, i.e., the perpendicular magnetization state, at temperatures not lower than 100° C. The Curie temperature of the readout layer 14 was 250° C.

Next, a mixed gas of argon and nitrogen was introduced into the sputtering device. Then, power was supplied to the Al target under a gas pressure of $4\times10^{-3}$ Torr so as to form a 20-nm-thick non-magnetic intermediate layer 15 made of AlN on the readout layer 14.

Subsequently, the inside of the sputtering device was evacuated again to $1\times10^{-6}$ Torr to be filled with an argon gas. Then, power was supplied to the GdDyFeCo alloy target under a gas pressure of $4\times10^{-3}$ Torr so as to form a 40-nm-thick recording layer 1 made of $(Gd_{0.50}Dy_{0.50})_{0.23}(Fe_{0.80}Co_{0.20})_{0.77}$ on the non-magnetic intermediate layer 15. The recording layer 1 is a perpendicular magnetization film having a magnetization in a direction perpendicular to the film surface up to its Curie temperature. The compensation temperature and the Curie temperature of the recording layer 1 were 25° C. and 275° C., respectively.

Next, a mixed gas of argon and nitrogen was introduced into the sputtering device. Then, power was supplied to the Al target under a gas pressure of $4\times10^{-3}$ Torr so as to form a 5-nm-thick non-magnetic intermediate layer 2 made of AlN on the readout layer 1.

Subsequently, the inside of the sputtering device was evacuated again to $1\times10^{-6}$ Torr to be filled with an argon gas. Then, power was supplied to the GdDyFeCo alloy target corresponding to the auxiliary recording layer 3 under a gas pressure of $4\times10^{-3}$ Torr so as to form a 60-nm-thick auxiliary recording layer 3 made of $Gd_{0.31}(Fe_{0.70}Co_{0.30})_{0.69}$ on the non-magnetic intermediate layer 2. The auxiliary recording layer 3 was in the in-plane magnetization state at 25° C., and in the perpendicular magnetization state at temperatures not lower than 200° C. The Curie temperature of the auxiliary recording layer 3 was 285° C.

Next, a mixed gas of argon and nitrogen was introduced into the sputtering device. Then, power was supplied to the Al target under a gas pressure of $4\times10^{-3}$ Torr so as to form a 20-nm-thick protective layer 10 made of AlN on the auxiliary recording layer 3.

Finally, an ultraviolet-ray-setting resin was applied onto the protective layer 10 by spincoating, and exposed to an ultraviolet ray to form an overcoat layer 11 on the protective layer 10.

(2) Recording and Readout Characteristics

The above-mentioned magneto-optical disk was measured to find the dependence of the CNR (carrier to noise ratio) on the recording magnetic field with an optical pickup using the semiconductor laser having a wavelength of 680 nm. The result of the measurement is shown as Example 5 in FIG. 14. A conventional magneto-optical recording medium which did not have the non-magnetic intermediate layer 2 nor the auxiliary recording layer 3 was measured to find the dependance of the CNR on the recording magnetic field for comparison purposes. The result of the measurement is shown as Comparative Example 5 in FIG. 14. The dependence of the CNR on the recording magnetic field shown in FIG. 14 indicates the results of the measurements carried out under the conditions of a track pitch of 1.1 μm, a recording magnetic domain pitch of 1.2 μm, and a read power of 2.5 mW. The measurements of the CNR were performed by varying the recording power so as to achieve a maximum CNR on the respective disks.

Figure 14:
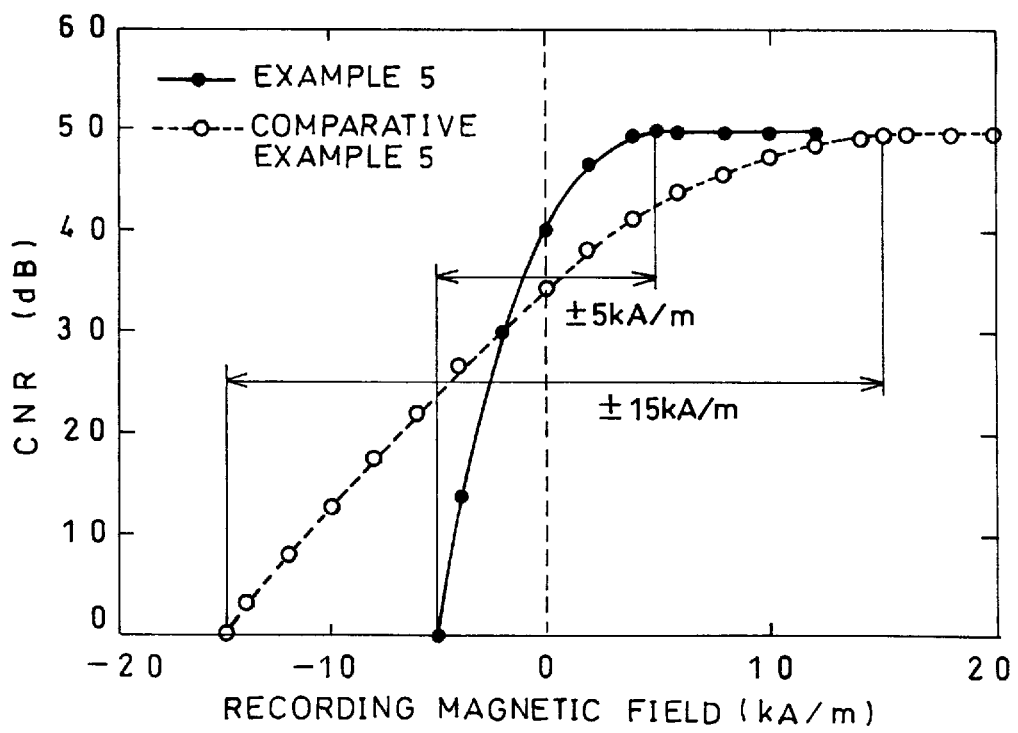
FIG. 14 is a graph showing the recording and readout characteristics of the super resolution magneto-optical disk of Embodiment 5.

The saturation value of the CNR was 46 dB in Example 1, Comparative Example 1, Example 3, and Comparative Example 3 shown in FIGS. 3 and 8, while the saturation value of the CNR was 49 dB in Example 5 and Comparative Example 5 shown in FIG. 14, showing a 3 dB increase. These results indicate that super resolution readout was achieved by the in-plane magnetization mask in the readout layer 14, and the readout resolution was improved.

As shown in FIG. 14, in Comparative Example 5, when the recording magnetic field was −15.0 kA/m, the CNR was zero. It is understood from this result that erasing is executable by a magnetic field of −15.0 kA/m. Moreover, the CNR was saturated when the recording magnetic field was 15.0 kA/m. Therefore, recording is executable by a magnetic field of 15.0 kA/m. A light beam of a uniform intensity was applied to this disk, and magnetic-field modulation recording was performed with a recording magnetic field which was modulated according to information. The recording was executable at a modulated magnetic field strength of 15.0 kA/m.

On the other hand, in Example 5, when the recording magnetic field was −5.0 kA/m, the CNR was zero. It is understood from this result that erasing is executable by a magnetic field of −5.0 kA/m. In addition, the CNR was saturated when the magnetic field was 5.0 kA/m. Therefore, it is understood that recording is executable by a magnetic field of 5.0 kA/m. The light beam of a uniform intensity was applied to this disk, and magnetic-field modulation recording was performed with a recording magnetic field which was modulated according to information. The recording was executable at a modulated magnetic field strength of 5.0 kA/m.

In short, the conventional super resolution magneto-optical disk of Comparative Example 5 required a recording and erasing magnetic field of ±15.0 kA/m. In contrast, it was confirmed that a recording and erasing magnetic field of ±5.0 kA/m was sufficient for the super resolution magneto-optical disk of Example 5. By comparison with the recording and erasing magnetic field of ±8.0 kA/m of Comparative Example 1, the recording and erasing magnetic field of Comparative Example 5 was high, 15.0 kA/m. Similarly, be comparison with the recording and erasing magnetic field of ±4.0 kA/m of Example 1, the recording and erasing magnetic field of Example 5 was high, 5.0 kA/m. Such results were obtained by varying the thickness and magnetic properties of the recording layer 1 to optimize the super resolution readout characteristics of Comparative Example 5 and Example 5.

This embodiment shows the results of measuring a magneto-optical disk having a 20-nm-thick $Gd_{0.30}(Fe_{0.82}Co_{0.18})_{0.70}$ film as the readout layer 14, a 20-nm-thick AlN film as the non-magnetic intermediate layer 15, a 40-nm-thick $(Gd_{0.50}Dy_{0.50})_{0.23}(Fe_{0.80}Co_{0.20})_{0.77}$ film as the recording layer 1, a 5-nm-thick AlN film as the non-magnetic intermediate layer 2, and a 60-nm-thick $Gd_{0.31}(Fe_{0.70}Co_{0.30})_{0.69}$ film as the auxiliary recording layer 3. However, the materials and compositions of these layers are not necessarily limited to those mentioned above.

For the readout layer 14, it is possible to use rare-earth and transition metal alloys which achieve the in-plane magnetization state at room temperature and the perpendicular magnetization state at the readout temperature, and contain Gd as a principal component of rare-earth metal, such as GdDyFeCo, GdTbFe, and GdTbFeCo. In order to produce a sufficient super resolution readout effect, the thickness of the readout layer 14 is preferably within a range of from 6 nm to 80 nm.

The non-magnetic intermediate layer 15 can be made of either transparent dielectric materials such as SiN, SiAlN and $TaO_2$, or non-magnetic metal alloys such as Al, Ti and Ta. In order to achieve good magnetostatic coupling between the recording layer 1 and the readout layer 14, the thickness of the non-magnetic intermediate layer 15 is preferably within a range of from 1 nm and 80 nm.

The recording layer 1 can be made of rare-earth and transition metal alloys containing Dy or Tb as a principal component of rare-earth metal, such as TbFeCo, DyFeCo, TbDyFeCo, GdTbFeCo, and GdDyFeCo. In order to achieve good magnetostatic coupling with the auxiliary recording layer 3, the thickness of the recording layer 1 is preferably within a range of from 10 nm and 80 nm like Example 1.

The non-magnetic intermediate layer 2 can be made of either transparent dielectric materials such as SiN, SiAlN and $TaO_2$, or non-magnetic metal alloys such as Al, Ti and Ta. The thickness of the non-magnetic intermediate layer 2 is preferably within a range of from 1 nm to 80 nm so as to achieve good magnetostatic coupling between the recording layer 1 and the auxiliary recording layer 3.

For the auxiliary recording layer 3, it is possible to use rare-earth and transition metal alloys which achieve the in-plane magnetization state at room temperature and the perpendicular magnetization state at the recording temperature, and contain Gd as a principal component of rare-earth metal, such as GdDyFeCo, GdTbFe, and GdTbFeCo. In order to achieve a decrease in the recording and erasing magnetic field and obtain good recording characteristics, the thickness of the auxiliary recording layer 3 is preferably within a range of from 10 nm to 200 nm.

By replacing the auxiliary recording layer 3 of Embodiment 5 with the auxiliary recording layer 3 and in-plane magnetization layer 12 of Embodiment 2, it is possible to realize the super resolution readout effect described in Embodiment 5 and a decrease in the recording and erasing magnetic field.

Figure 15:
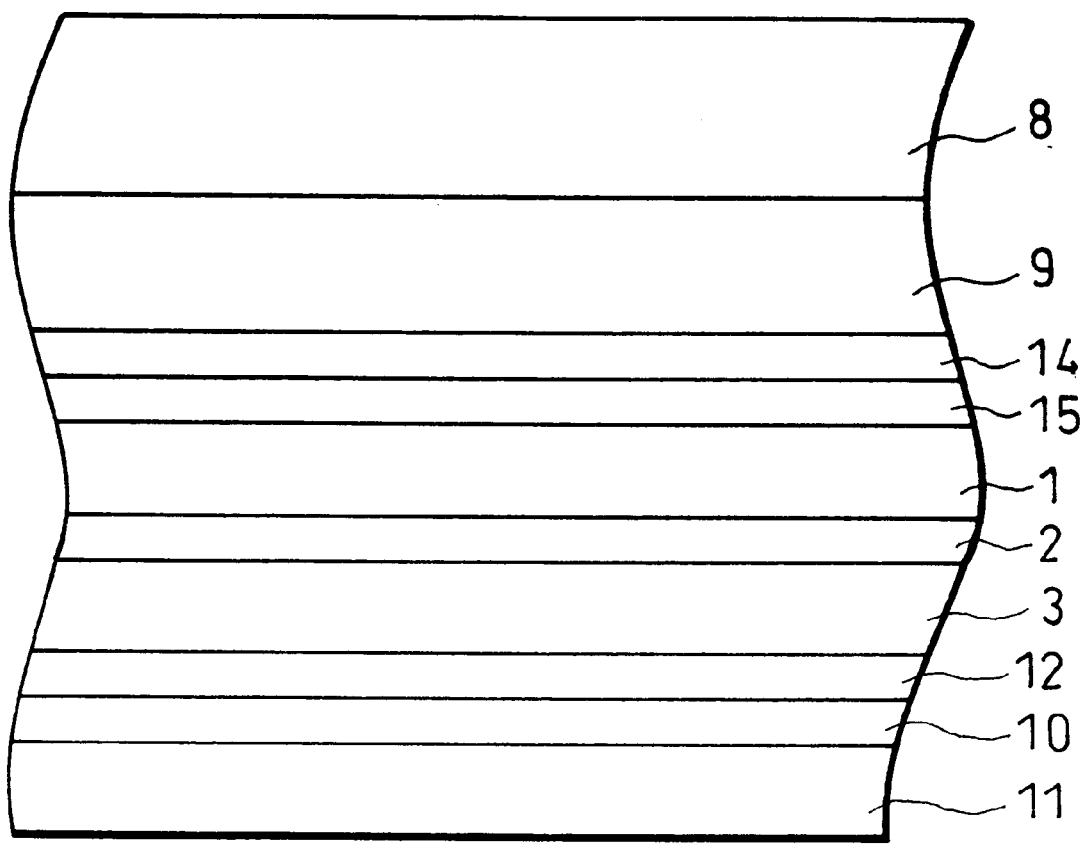
FIG. 15 is an explanatory view showing the film structure of the super resolution magneto-optical disk of Embodiment 5.

Here, a measurement was performed on a disk having a substrate 8, a transparent dielectric layer 9, a readout layer 14, a non-magnetic intermediate layer 15, a recording layer 1, a non-magnetic intermediate layer 2, an auxiliary recording layer 3, an in-plane magnetization layer 12, a protective layer 10, and an overcoat layer 11 layered in this order as shown in FIG. 15.

The substrate 8, transparent dielectric layer 9, non-magnetic intermediate layer 2, auxiliary recording layer 3, in-plane magnetization layer 12, protective layer 10, and overcoat layer 11 were formed in the same manner as in Example 2 of Embodiment 2. The recording layer 1, readout layer 14, and non-magnetic layer 15 were formed in the same manner as in Example 5.

This super resolution magneto-optical disk was measured to find the dependence of the CNR on the recording magnetic field with an optical pickup using the semiconductor laser having a wavelength of 680 nm. As a result, properties similar to those of Example 5 shown in FIG. 14 were obtained. Specifically, it was confirmed that, even when the auxiliary recording layer 3 of Example 5 was replaced with the auxiliary recording layer 3 and in-plane magnetization layer 12 of Example 2, this disk achieved a CNR of 49 dB, and recording and erasing with a recording and erasing magnetic field of ±5.0 kA/m like Example 5.

Embodiment 6

The auxiliary recording layer 3 of the present invention can also decrease the recording and reading magnetic field on a super resolution magneto-optical recording medium having the recording layer 1, the writing layer 13 and the readout layer 14. Referring to the drawings, the following description will explain in detail Embodiment 6 in which the present invention is adopted into a super resolution magneto-optical recording medium. The members having the same function as in the above-mentioned embodiments will be designated by the same code and their description will be omitted.

Figure 16:
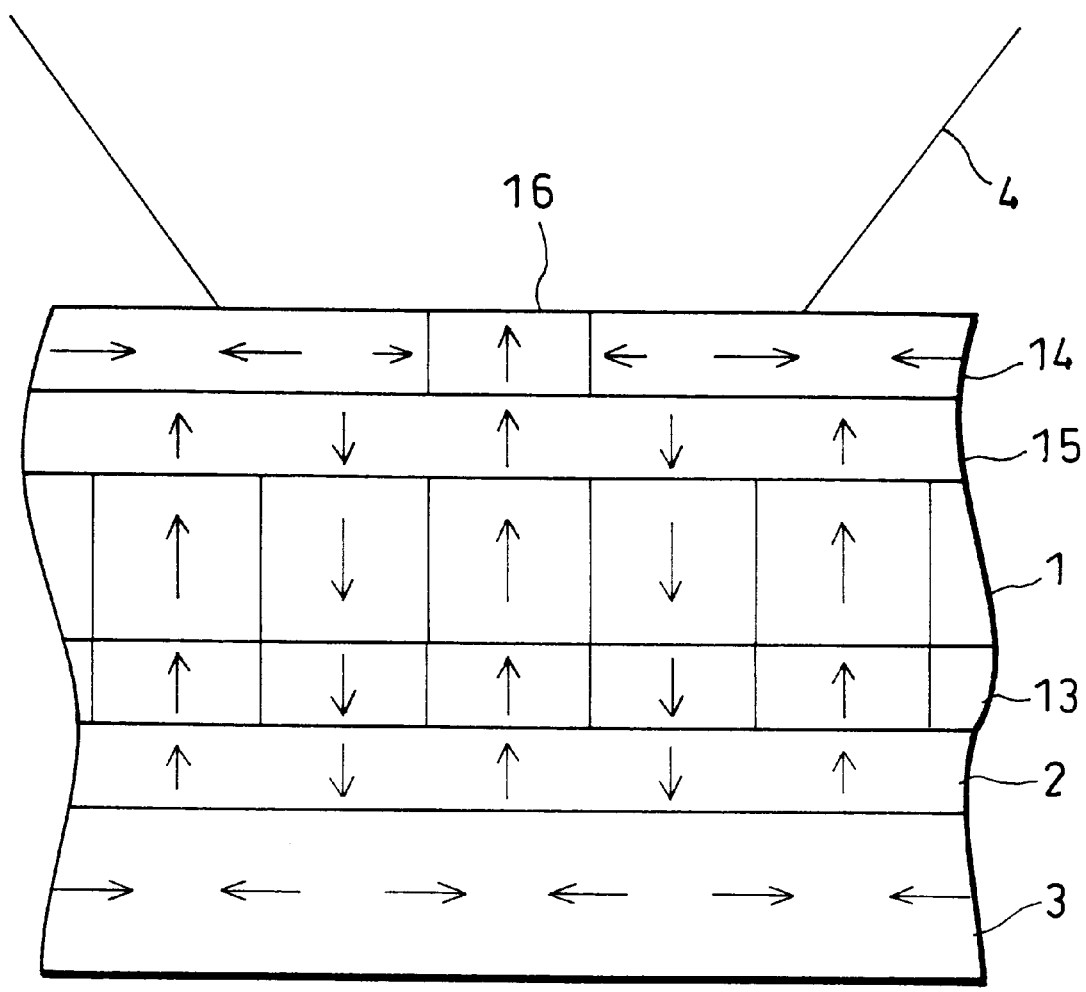
FIG. 16 is an explanatory view showing the principle of reading information on a super resolution magneto-optical disk according to Embodiment 6.
Figure 17:
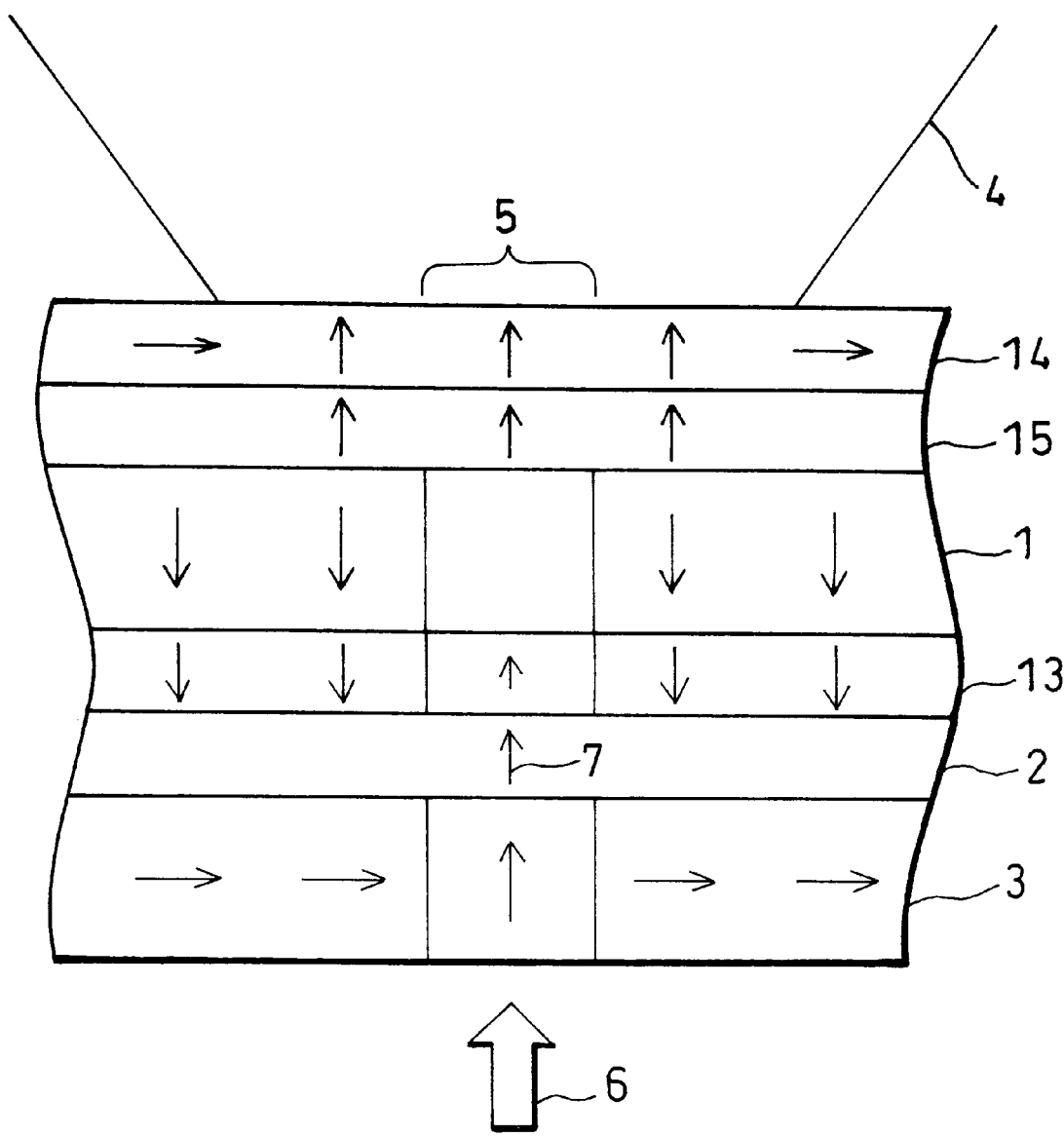
FIG. 17 is an explanatory view showing the principle of recording information on the super resolution magneto-optical disk of Embodiment 6.

FIGS. 16 and 17 explain the magnetization state when recording and reading information on a super resolution magneto-optical recording medium having a readout layer 14 which is in the in-plane magnetization state at room temperature and changes into the perpendicular magnetization state at the readout temperature, a recording layer 1 which is a perpendicular magnetization film, a writing layer 13 provided for the purpose of improving the sensitivity of the recording layer 1 to a magnetic field, and an auxiliary recording layer 3 which is in the in-plane magnetization state at room temperature and changes into the perpendicular magnetization state at the recording temperature, wherein the readout layer 14, recording layer 1, writing layer 13 and auxiliary recording layer 3 achieve magnetostatic coupling. In order to achieve magnetostatic coupling between the readout layer 14 and the recording layer 1 and writing layer 13, a non-magnetic intermediate layer 15 is provided. Moreover, in order to achieve magnetostatic coupling between the recording layer 1 and writing layer 13 and the auxiliary recording layer 3, a non-magnetic intermediate layer 2 is provided.

The polar Kerr effect is used when reading out a signal from a magneto-optical disk according to Embodiment 6. As illustrated in FIG. 16, the light beam 4 emitted by the semiconductor laser is converged on the readout layer 14 by means of an objective lens to bring the readout layer 14 into the perpendicular magnetization state. The information on the recording layer 1 is transferred to the readout layer 14 and read out only from this portion, i.e., the readout-temperature region 16 heated to the readout temperature. In a portion where the readout layer 14 is in the in-plane magnetization state, the information on the recording layer 1 is masked by the in-plane magnetization of the readout layer 14, and therefore a readout-temperature region 16 smaller than the spot of the converged light beam 4 is formed. Thus, super resolution magnetic readout is realized.

In the readout-temperature region 16, since the auxiliary recording layer 3 is in the in-plane magnetization state, the in-plane magnetization film which achieves magnetostatic coupling with the recording layer 1 and the writing layer 13 is present on a side opposite to the readout layer 14. By providing such an auxiliary recording layer 3, leakage magnetic fields from the recording layer 1 and writing layer 13 are efficiently confined, and the effect of the leakage magnetic fields on the readout layer 14 can be enhanced. It is therefore possible to improve the quality of super resolution readout signals.

The Curie temperature recording method is used as the method of recording information. In this method, as shown in FIG. 17, recording is carried out by converging the light beam 4 emitted by the semiconductor laser on the readout layer 14, recording layer 1 and writing layer 13 by the objective lens, and causing the magnetization direction of the recording layer 1 and writing layer 13 to be parallel to the direction of the external magnetic field 6 in the heated portion. Here, since the writing layer 13 whose Curie temperature is higher than that of the recording layer 1 is placed adjacent to the recording layer 1, recording on the recording layer 1 is determined by the magnetization state of the writing layer 13 at temperatures not lower than the Curie temperature of the recording layer 1. For the writing layer 13, a magnetic film having a higher sensitivity to an external magnetic field compared to the recording layer 1 is used, and thus the magnetization direction can be switched with a smaller external magnetic field compared to the structure in which the recording layer 1 is present alone.

Moreover, the auxiliary recording layer 3 is formed to achieve magnetostatic coupling with the writing layer 13. The auxiliary recording layer 3 is a magnetic film which has a magnetization in an in-plane direction with respect to the film surface, i.e., the in-plane magnetization state, when it is not heated, and a magnetization in a direction perpendicular to the film surface, i.e., the perpendicular magnetization state at the recording temperature. By applying an external magnetic field to the writing layer 13 in the recording-temperature region 5 heated to the recording temperature, the magnetization direction of the writing layer 13 becomes parallel to the direction of the external magnetic field. When the magnetization direction of the recording layer 1 is aligned with the magnetization direction of the writing layer 13 with a decrease in temperature, recording is executed.

In Embodiment 6, the auxiliary recording layer 3 is in the in-plane magnetization state outside of the recording-temperature region 5, and in the perpendicular magnetization state in the recording-temperature region 5. Consequently, a leakage magnetic field from the auxiliary recording layer 3 is not present outside of the recording-temperature region 5, while the leakage magnetic field 7 from the auxiliary recording layer 3 is present in the recording-temperature region 5. At this time, since the magnetization direction of the auxiliary recording layer 3 becomes parallel to the direction of the external magnetic field 6, the leakage magnetic field 7 from the auxiliary recording layer 3 also becomes parallel to the external magnetic field 6. Since the external magnetic field 6 and the leakage magnetic field 7 from the auxiliary recording layer 3 function as the external magnetic field, it is possible to perform recording on the recording layer 1 with an external magnetic field smaller than that of a conventional structure.

Additionally, the readout layer 14 is in the perpendicular magnetization state in the recording-temperature region 5. However, since the recording layer 1 and writing layer 13 are heated to a temperature in the vicinity of the Curie temperature, a magnetostatic coupling force exerted on the readout layer 14 from the recording layer 1 and writing layer 13 becomes very small. Therefore, in the recording-temperature region 5, the magnetization direction of the readout layer 14 also becomes the same as the direction of the external magnetic field 6. Consequently, the readout layer 14 works so as to assist the recording by the external magnetic field 6 like the leakage magnetic field 7.

Embodiment 6 explains an example in which a magneto-optical disk is used as the magneto-optical recording medium.

Figure 18:
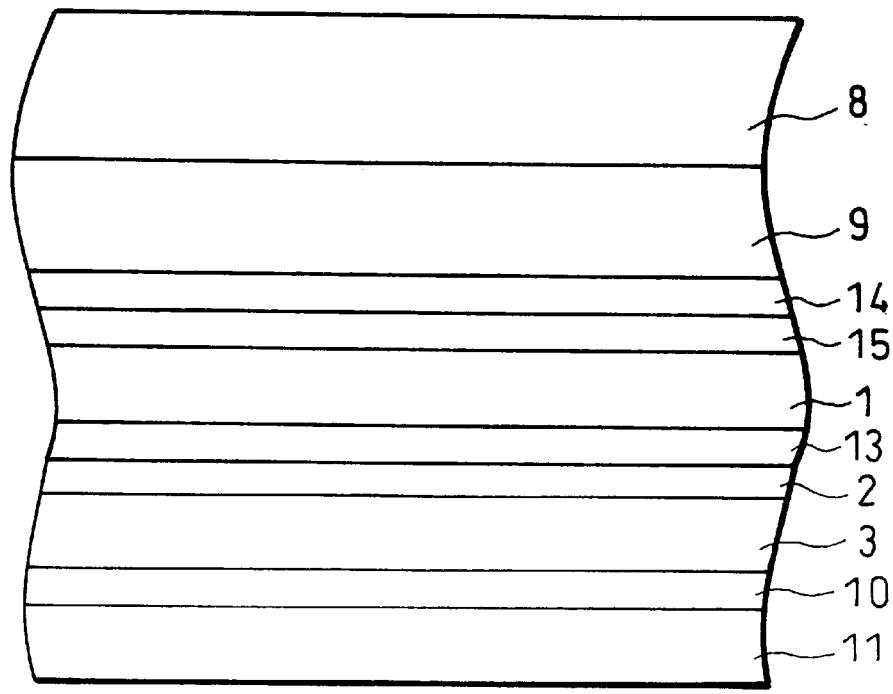
FIG. 18 is an explanatory view showing the film structure of the super resolution magneto-optical disk of Embodiment 6.

As illustrated in FIG. 18, the magneto-optical disk according to Embodiment 6 includes a disk main body formed by layering the substrate 8, transparent dielectric layer 9, readout layer 14, non-magnetic intermediate layer 15, recording layer 1, writing layer 13, non-magnetic intermediate layer 2, auxiliary recording layer 3, protective layer 10, and overcoat layer 11 in this order.

The substrate 8, transparent dielectric layer 9, readout layer 14, non-magnetic intermediate layer 15, non-magnetic intermediate layer 2, auxiliary recording layer 3, protective layer 10, and overcoat layer 11 are formed in the same manner as in Embodiment 5.

The recording layer 1 and writing layer 13 are perpendicular magnetization films made of rare-earth and transition metal alloys, and achieve exchange coupling therebetween. In order to improve the sensitivity of the recording layer 1 to a magnetic field, the Curie temperature of the writing layer 13 needs to be set higher than that of the recording layer 1.

The following description will explain a specific example of the magneto-optical disk of this embodiment by separately describing (1) the fabrication process of the magneto-optical disk and (2) the recording and readout characteristics.

(1) Fabrication Process of the Magneto-Optical Disk

First, a polycarbonate substrate 8 formed in a disk shape with a pregroove and prepits was placed on a substrate holder in a sputtering device provided with an Al target, a GdDyFeCo alloy target and three kinds of GdFeCo alloy targets corresponding to the readout layer 14, writing layer 13 and auxiliary recording layer 3. Then, the inside of the sputtering device was evacuated to $1\times10^{-6}$ Torr to be filled with a mixed gas of argon and nitrogen. Then, power was supplied to the Al target under a gas pressure of $4\times10^{-3}$ Torr so as to form an 80-nm-thick transparent dielectric layer 9 made of AlN on the substrate 8.

Next, the inside of the sputtering device was evacuated again to $1\times10^{-6}$ Torr to be filled with an argon gas. Then, power was supplied to the GdFeCo alloy target corresponding to the readout layer 14 under a gas pressure of $4\times10^{-3}$ Torr so as to form a 20-nm-thick readout layer 14 made of $Gd_{0.30}(Fe_{0.82}Co_{0.18})_{0.70}$ on the transparent dielectric layer 9. The readout layer 14 had a magnetization in an in-plane direction with respect to the film surface, i.e., the in-plane magnetization state, up to 100° C., and a magnetization in a direction perpendicular to the film surface, i.e., the perpendicular magnetization state, at temperatures not lower than 100° C. The Curie temperature of the readout layer 14 was 250° C.

Next, a mixed gas of argon and nitrogen was introduced into the sputtering device. Then, power was supplied to the Al target under a gas pressure of $4\times10^{-3}$ Torr so as to form a 20-nm-thick non-magnetic intermediate layer 15 made of AlN on the readout layer 14.

Subsequently, the inside of the sputtering device was evacuated again to $1\times10^{-6}$ Torr to be filled with an argon gas. Then, power was supplied to the GdDyFeCo alloy target under a gas pressure of $4\times10^{-3}$ Torr so as to form a 40-nm-thick recording layer 1 made of $(Gd_{0.50}Dy_{0.50})_{0.23}(Fe_{0.80}Co_{0.20})_{0.77}$ on the non-magnetic intermediate layer 15. The recording layer 1 is a perpendicular magnetization film having a magnetization in a direction perpendicular to the film surface up to its Curie temperature. The compensation temperature and the Curie temperature of the recording layer 1 were 25° C. and 275° C., respectively.

Subsequently, power was supplied to the GdFeCo alloy target corresponding to the writing layer 13 under a gas pressure of $4\times10^{-3}$ Torr so as to form a 20-nm-thick writing layer 13 made of $Gd_{0.25}(Fe_{0.75}Co_{0.25})_{0.75}$ on the recording layer 1. The writing layer 13 is a perpendicular magnetization film having a magnetization in a direction perpendicular to the film surface up to its Curie temperature. The Curie temperature was 320° C.

Next, a mixed gas of argon and nitrogen was introduced into the sputtering device. Then, power was supplied to the Al target under a gas pressure of $4\times10^{-3}$ Torr so as to form a 5-nm-thick non-magnetic intermediate layer 2 made of AlN on the writing layer 13.

Subsequently, the inside of the sputtering device was evacuated again to $1\times10^{-6}$ Torr to be filled with an argon gas. Then, power was supplied to the GdFeCo alloy target corresponding to the auxiliary recording layer 3 under a gas pressure of $4\times10^{-3}$ Torr so as to form a 60-nm-thick auxiliary recording layer 3 made of $Gd_{0.31}(Fe_{0.70}Co_{0.30})_{0.69}$ on the non-magnetic intermediate layer 2. The auxiliary recording layer 3 was in the in-plane magnetization state at 25° C., and in the perpendicular magnetization state at temperatures not lower than 200° C. The Curie temperature of the auxiliary recording layer 3 was 320° C.

Next, a mixed gas of argon and nitrogen was introduced into the sputtering device. Then, power was supplied to the Al target under a gas pressure of $4\times10^{-3}$ Torr so as to form a 20-nm-thick protective layer 10 made of AlN on the auxiliary recording layer 3.

Finally, an ultraviolet-ray-setting resin was applied onto the protective layer 10 by spincoating, and exposed to an ultraviolet ray to form an overcoat layer 11 on the protective layer 10.

(2) Recording and Readout Characteristics

The above-mentioned magneto-optical disk was measured to find the dependence of the CNR (carrier to noise ratio) on the recording magnetic field with an optical pickup using the semiconductor laser having a wavelength of 680 nm. The result of the measurement is shown as Example 6 in FIG. 19. A conventional super resolution magneto-optical recording medium which did not have the non-magnetic intermediate layer 2 nor the auxiliary recording layer 3 was measured to find the dependance of the CNR on the recording magnetic field for comparison purposes. The result of the measurement is shown as Comparative Example 6 in FIG. 19. The dependence of the CNR on the recording magnetic field shown in FIG. 19 indicates the results of the measurements carried out under the conditions of a track pitch of 1.1 $\mu$m, a recording magnetic domain pitch of 1.2 $\mu$m, and a read power of 2.5 mW. The measurements of the CNR were performed by varying the recording power so as to achieve a maximum CNR on the respective disks.

The saturation value of the CNR was 49 dB in Example 6 and Comparative Example 6 like the saturation values of Example 5 and Comparative Example 5 shown in FIG. 14. It was also confirmed in Example 6 and Comparative Example 6 that super resolution readout was achieved by the in-plane magnetization mask in the readout layer 14, and the readout resolution was improved.

Figure 19:
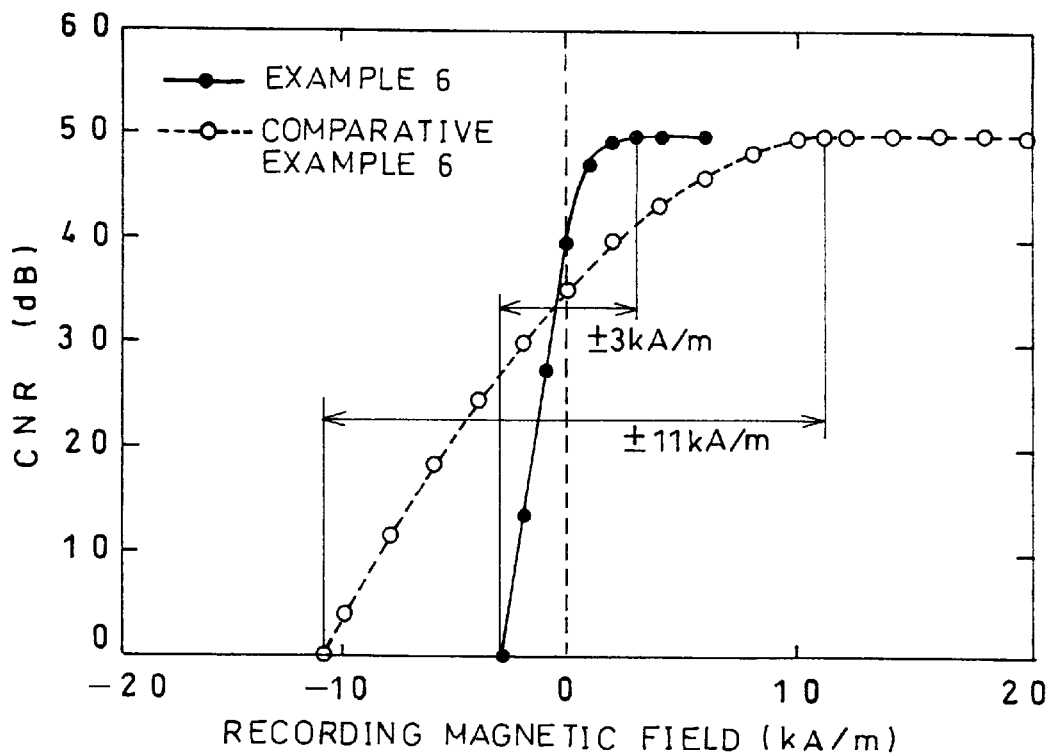
FIG. 19 is a graph showing the recording and readout characteristics of the super resolution magneto-optical disk of Embodiment 6.

As shown in FIG. 19, in Comparative Example 6, when the recording magnetic field was −11.0 kA/m, the CNR was zero. It is understood from this result that erasing is executable by a magnetic field of −11.0 kA/m. Moreover, the CNR was saturated when the recording magnetic field was 11.0 kA/m. Therefore, recording is executable by a magnetic field of 11.0 kA/m. A light beam of a uniform intensity was applied to this disk, and magnetic-field modulation recording was performed with a recording magnetic field which was modulated according to information. The recording was executable at a modulated magnetic field strength of 11.0 kA/m.

On the other hand, in Example 6, when the recording magnetic field was −3.0 kA/m, the CNR was zero. It is understood from this result that erasing is executable by a magnetic field of −3.0 kA/m. In addition, the CNR was saturated when the magnetic field was 3.0 kA/m. Therefore, recording is executable by a magnetic field of 3.0 kA/m. The light beam of a uniform intensity was applied to this disk, and magnetic-field modulation recording was performed with a recording magnetic field which was modulated according to information. The recording was executable at a modulated magnetic field strength of 3.0 kA/m.

In short, the conventional super resolution magneto-optical disk of Comparative Example 6 required a recording and erasing magnetic field of ±11.0 kA/m. In contrast, it was confirmed that a recording and erasing magnetic field of ±3.0 kA/m was sufficient for the super resolution magneto-optical disk of Example 6. Here, by comparison with the recording and erasing magnetic field of ±5.0 kA/m of Comparative Example 3, the recording and erasing magnetic field of Comparative Example 6 was high, 11.0 kA/m. Such an increase was achieved by arranging the recording layer 1 to have a thickness and magnetic properties which are different from those of Comparative Example 6 so as to optimize the super resolution readout characteristics of Comparative Example 6. In Example 6, since a recording layer 1 having the same properties as those in Comparative Example 6 was used, a magnetic field stronger than the recording and erasing magnetic field of Example 3 was also required.

This embodiment shows the results of measuring a magneto-optical disk having a 20-nm-thick $Gd_{0.30}(Fe_{0.82}Co_{0.18})_{0.70}$ film as the readout layer 14, a 20-nm-thick AlN film as the non-magnetic intermediate layer 15, a 40-nm-thick $(Gd_{0.50}Dy_{0.50})_{0.23}(Fe_{0.80}Co_{0.20})_{0.77}$ film as the recording layer 1, a 20-nm-thick $Gd_{0.25}(Fe_{0.75}Co_{0.25})_{0.75}$ film as the writing layer 13, a 5-nm-thick AlN film as the non-magnetic intermediate layer 2, and a 60-nm-thick $Gd_{0.31}(Fe_{0.70}Co_{0.30})_{0.69}$ film as the auxiliary recording layer 3. However, the materials and compositions of these layers are not necessarily limited to those mentioned above.

For the readout layer 14, it is possible to use rare-earth and transition metal alloys which achieve the in-plane magnetization state at room temperature and the perpendicular magnetization state at the readout temperature, and contain Gd as a principal component of rare-earth metal, such as GdDyFeCo, GdTbFe, and GdTbFeCo. In order to produce a sufficient super resolution readout effect, the thickness of the readout layer 14 is preferably within a range of from 5 nm to 80 nm.

The non-magnetic intermediate layer 15 can be made of either transparent dielectric materials such as SiN, SiAlN and $TaO_2$, or non-magnetic metal alloys such as Al, Ti and Ta. In order to achieve good magnetostatic coupling between the recording layer 1 and the readout layer 14, the thickness of the non-magnetic intermediate layer 15 is preferably within a range of from 1 nm and 80 nm.

The recording layer 1 can be made of rare-earth and transition metal alloys containing Dy or Tb as a principal component of rare-earth metal, such as TbFeCo, DyFeCo, TbDyFeCo, GdTbFeCo, and GdDyFeCo. For the writing layer 13, it is possible to use the same GdFeCo as that shown in Table 10 of Embodiment 3. The thicknesses of the recording layer 1 and writing layer 13 need to be the same as those in Example 3. Namely, the thickness of the recording layer 1 needs to be within a range of from 10 nm to 80 nm, and the thickness of the writing layer 13 needs to be within a range of from 5 nm to 80 nm.

The non-magnetic intermediate layer 2 can be made of either transparent dielectric materials such as SiN, SiAlN and $TaO_2$, or non-magnetic metal alloys such as Al, Ti and Ta. The thickness of the non-magnetic intermediate layer 2 is preferably within a range of from 1 nm to 80 nm so as to achieve good magnetostatic coupling between the recording layer 1 and the auxiliary recording layer 3.

For the auxiliary recording layer 3, it is possible to use rare-earth and transition metal alloys which achieve the in-plane magnetization state at room temperature and the perpendicular magnetization state at the recording temperature, and contain Gd as a principal component of rare-earth metal, such as GdDyFeCo, GdTbFe, and GdTbFeCo. In order to achieve a decrease in the recording and erasing magnetic field and obtain good recording characteristics, the thickness of the auxiliary recording layer 3 is preferably within a range of from 10 nm to 200 nm.

By replacing the auxiliary recording layer 3 of Embodiment 6 with the auxiliary recording layer 3 and in-plane magnetization layer 12 of Embodiment 2, it is possible to realize the super resolution readout effect described in Embodiment 6 and decrease the recording and erasing magnetic field.

Figure 20:
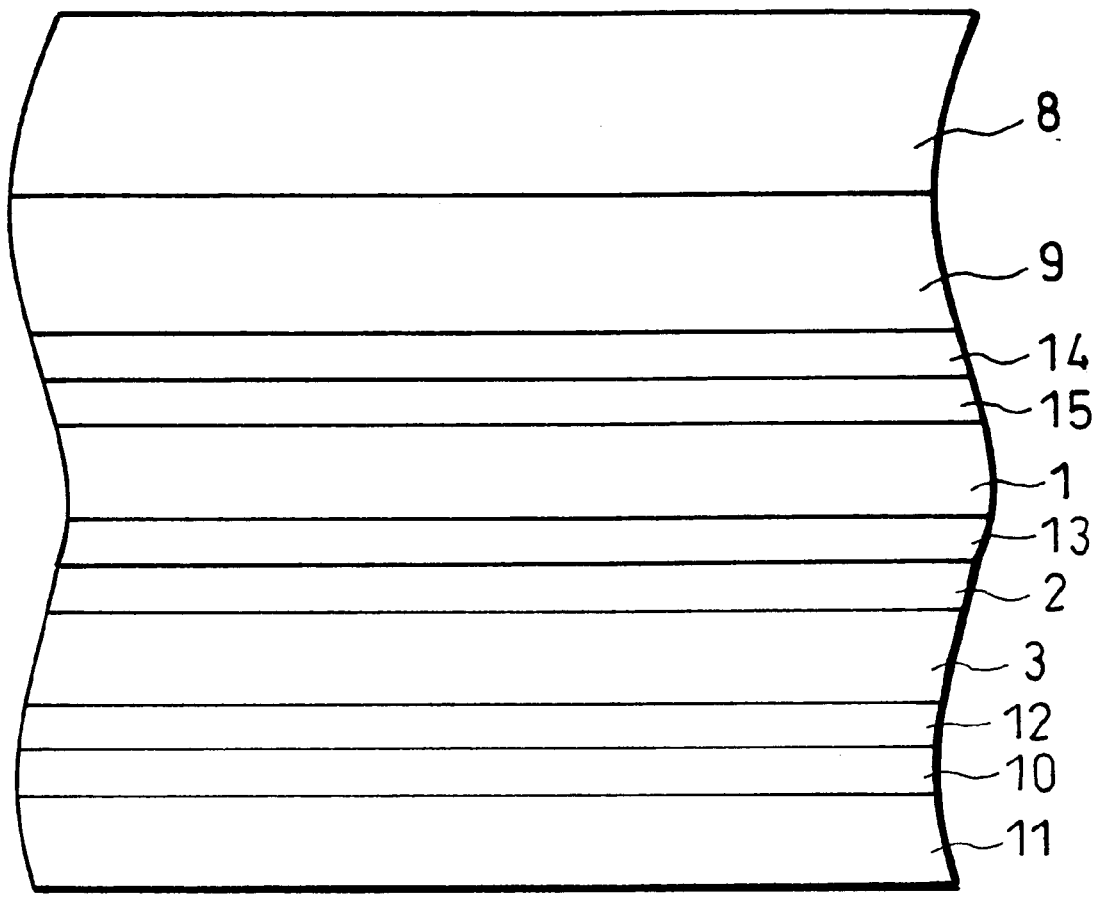
FIG. 20 is an explanatory view showing the film structure of the super resolution magneto-optical disk of Embodiment 6.

Here, a measurement was performed on a disk having a substrate 8, a transparent dielectric layer 9, a readout layer 14, a non-magnetic intermediate layer 15, a recording layer 1, a writing layer 13, a non-magnetic intermediate layer 2, an auxiliary recording layer 3, an in-plane magnetization layer 12, a protective layer 10, and an overcoat layer 11 layered in this order as shown in FIG. 20.

The substrate 8, transparent dielectric layer 9, readout layer 14, non-magnetic intermediate layer 15, recording layer 1, writing layer 13, non-magnetic intermediate layer 2, protective layer 10, and overcoat layer 11 are formed in the same manner as in Embodiment 6. Further, the auxiliary recording layer 3 and the in-plane magnetization layer 12 are formed in the same manner as in Example 2.

The above-mentioned super resolution magneto-optical disk was measured to find the dependence of the CNR on the recording magnetic field with an optical pickup using the semiconductor laser having a wavelength of 680 nm. As a result, properties similar to those of Example 6 shown in FIG. 19 were obtained. Specifically, it was confirmed that, even when the auxiliary recording layer 3 of Example 6 was replaced with the auxiliary recording layer 3 and in-plane magnetization layer 12 of Example 2, this disk achieved a CNR of 49 dB, and recording and erasing with a recording and erasing magnetic field of ±3.0 kA/m like Example 6.

As described above, a first magneto-optical recording medium of the present invention is based on a magneto-optical recording medium having a recording layer on which information is recorded by heating the recording layer to a temperature not lower than the recording temperature and applying an external magnetic field thereto, and characterized in including an auxiliary recording layer which achieves magnetostatic coupling with the recording layer, and is in the in-plane magnetization state at temperatures lower than the recording temperature and in the perpendicular magnetization state at temperatures not lower than the recording temperature.

In this structure, when recording information, the magnetization direction of the auxiliary recording layer is aligned with a magnetization direction (perpendicular direction) corresponding to the external magnetic field, and a leakage magnetic field occurs. As a result, a total magnetic field, which is produced by adding the leakage magnetic field to the external magnetic field, acts on the recording layer. It is therefore possible to perform recording at a lower magnetic field strength compared to a structure in which information is recorded only by the external magnetic field.

Thus, the magneto-optical recording medium of the present invention can record information on the recording layer by causing the leakage magnetic field from the auxiliary recording layer to act on the recording layer. Namely, there is a fundamental difference between the magneto-optical recording medium of the present invention and the above-mentioned conventional magneto-optical recording medium using an exchange coupling force. In general, an external magnetic field required for aligning the magnetization direction of the in-plane magnetization layer which changes into the perpendicular magnetization state with a rise in temperature with a desired direction (upward or downward direction) under a heated condition is lower than an external magnetic field required for switching the magnetization of a magnetic layer which achieves exchange coupling with the recording layer. It is therefore possible to record information on the magneto-optical recording medium of the present invention at a lower magnetic field strength than that for the conventional magneto-optical recording medium.

A second magneto-optical recording medium of the present invention is based on the first magneto-optical recording medium, and characterized in including a readout layer that achieves magnetostatic coupling with the recording layer and is made of a material which is in the in-plane magnetization state at room temperature and in the perpendicular magnetization state in a temperature range in the vicinity of the readout temperature.

In this structure, since the leakage magnetic field produced from the auxiliary recording layer assists the recording magnetic field, it is possible to achieve a decrease in the recording magnetic field for the magnetically induced super resolution magneto-optical recording medium.

A third magneto-optical recording medium of the present invention is based on the first or second magneto-optical recording medium, and characterized in including an in-plane magnetization layer which has a Curie temperature in the vicinity of the recording temperature, and achieves exchange coupling with the auxiliary recording layer.

In this structure, it is possible to prevent the magnetization direction of the auxiliary recording layer from changing into a direction oblique to the film surface by the function of the in-plane magnetization layer which achieves exchange coupling with the auxiliary recording layer. Consequently, the leakage magnetic field from the auxiliary recording layer is stabilized, and the recording operation is certainly performed.

A fourth magneto-optical recording medium of the present invention is based on any one of the first to third magneto-optical recording media, and characterized in including a writing layer which is formed by a material whose magnetization is switched at a lower magnetic field strength compared to the recording layer in a temperature range in the vicinity of the recording temperature, and achieves exchange coupling with the recording layer.

In the magneto-optical recording medium of this structure, since the writing layer which achieves exchange coupling with the recording layer is provided, it is possible to switch the magnetization direction of the recording layer by switching the magnetization direction of the writing layer. Therefore, if the writing layer is made of a material whose magnetization is switched at a lower magnetic field strength compared to the recording layer, recording can be performed at a further lower magnetic field strength.

A fifth magneto-optical recording medium of the present invention is based on the first or second magneto-optical recording medium, and characterized in that the recording layer, first non-magnetic intermediate layer, auxiliary recording layer and protective layer are deposited in this order, the thickness of the recording layer is within a range of from 10 nm to 80 nm, the thickness of the first non-magnetic intermediate layer is within a range of from 1 nm to 80 nm, and the thickness of the auxiliary recording layer is within a range of from 110 nm to 200 nm.

In this structure, the magnetostatic coupling between the recording layer and the auxiliary recording layer is stably achieved, and the leakage magnetic field from the auxiliary recording layer assists the recording magnetic field, thereby decreasing the recording magnetic field for the magneto-optical recording medium.

Moreover, it is possible to optimize the thicknesses of the recording layer, first non-magnetic intermediate layer and auxiliary recording layer, and stably decrease the recording magnetic field for the magneto-optical recording medium and magnetically induced super resolution magneto-optical recording medium.

Furthermore, a sixth magneto-optical recording medium of the present invention is based on the third magneto-optical recording medium, and characterized in that the recording layer, first non-magnetic intermediate layer, auxiliary recording layer, in-plane magnetization layer and protective layer are deposited in this order, the thickness of the recording layer is within a range of from 10 nm to 80 nm, the thickness of the first non-magnetic intermediate layer is within a range of from 1 nm to 80 nm, the thickness of the auxiliary recording layer is within a range of from 10 nm to 120 nm, and the thickness of the in-plane magnetization layer is within a range of from 5 nm to 150 nm.

In this structure, the magnetostatic coupling between the recording layer and the auxiliary recording layer is stably achieved, and the leakage magnetic field from the auxiliary recording layer assists the recording magnetic field, thereby decreasing the recording magnetic field for the magneto-optical recording medium.

Moreover, it is possible to optimize the thicknesses of the recording layer, first non-magnetic intermediate layer, auxiliary recording layer and in-plane magnetization layer, and stably decrease the recording magnetic field on a magneto-optical recording medium and a magnetically induced super resolution magneto-optical recording medium.

A seventh magneto-optical recording medium of the present invention is based on the fourth magneto-optical recording medium, and characterized in that the recording layer, writing layer, first non-magnetic intermediate layer, auxiliary recording layer and protective layer are deposited in this order, the thickness of the recording layer is within a range of from 10 nm to 80 nm, the thickness of the writing layer is within a range of from 5 nm to 80 nm, the thickness of the first non-magnetic intermediate layer is within a range of from 1 nm to 80 nm, and the thickness of the auxiliary recording layer is within a range of from 10 nm to 200 nm.

In this structure, the magnetostatic coupling between the recording layer and the auxiliary recording layer is stably achieved, and the leakage magnetic field from the auxiliary recording layer assists the recording magnetic field, thereby decreasing the recording magnetic field for the magneto-optical recording medium.

Moreover, it is possible to optimize the thicknesses of the recording layer, writing layer, first non-magnetic intermediate layer and auxiliary recording layer, and stably decrease the recording magnetic field for the magneto-optical recording medium and magnetically induced super resolution magneto-optical recording medium.

An eighth magneto-optical recording medium of the present invention is based on the fourth magneto-optical recording medium, and characterized in that the recording layer, writing layer, first non-magnetic intermediate layer, auxiliary recording layer, in-plane magnetization layer and protective layer are deposited in this order, the thickness of the recording layer is within a range of from 10 nm to 80 nm, the thickness of the writing layer is within a range of from 5 nm to 80 nm, the thickness of the first non-magnetic intermediate layer is within a range of from 1 nm to 80 nm, the thickness of the auxiliary recording layer is within a range of from 10 nm to 120 nm, and the thickness of the in-plane magnetization layer is within a range of from 5 nm to 150 nm.

In this structure, the magnetostatic coupling between the recording layer and the auxiliary recording layer is stably achieved, and the leakage magnetic field from the auxiliary recording layer assists the recording magnetic field, thereby decreasing the recording magnetic field for the magneto-optical recording medium.

Moreover, it is possible to optimize the thicknesses of the recording layer, writing layer, first non-magnetic intermediate layer, auxiliary recording layer and in-plane magnetization layer, and stably decrease the recording magnetic field for the magneto-optical recording medium and magnetically induced super resolution magneto-optical recording medium.

A ninth magneto-optical recording medium of the present invention is based on the fifth or seventh magneto-optical recording medium, and characterized in that the auxiliary recording layer satisfies a general formula ($\alpha$1) and a condition ($\alpha$2)

$$Gd_{X1}(Fe_{Y1}Co_{1-Y1})_{1-X1} \quad (\alpha1)$$

$$0.29 \leq X1 \leq 0.33$$

$$0.60 \leq Y1 \leq 0.80 \quad (\alpha2).$$

In this structure, it is possible to optimize the magnetic properties of the auxiliary recording layer, and stably decrease the recording magnetic field for the magneto-optical recording medium and magnetically induced super resolution magneto-optical recording medium.

A tenth magneto-optical recording medium of the present invention is based on the fifth or seventh magneto-optical recording medium, and characterized in that the recording layer and the auxiliary recording layer satisfy a condition (A)

$$Tc1-120° C. \leq Tp \leq Tc1 \quad (A)$$

where Tc1 is the Curie temperature of the recording layer, and Tp is a temperature at which the auxiliary recording layer changes into the perpendicular magnetization state.

In this structure, it is possible to optimize the relationship between the Curie temperature of the recording layer and the temperature at which the auxiliary recording layer changes into the perpendicular magnetization state, and stably decrease the recording magnetic field for the magneto-optical recording medium and magnetically induced super resolution magneto-optical recording medium.

An eleventh magneto-optical recording medium of the present invention is based on the sixth or eighth magneto-optical recording medium, and characterized in that the auxiliary recording layer has a composition satisfying a general formula ($\beta$1) and a condition ($\beta$2)

$$Gd_{X2}(Fe_{Y2}Co_{1-Y2})_{1-X2} \quad (\beta1)$$

$$0.22 \leq X2 \leq 0.33$$

$$0.60 \leq Y2 \leq 0.85 \quad (\beta2)$$

In this structure, it is possible to optimize the magnetic properties of the auxiliary recording layer, and stably decrease the recording magnetic field for the magneto-optical recording medium and magnetically induced super resolution magneto-optical recording medium.

A twelfth magneto-optical recording medium of the present invention is based on the sixth or eighth magneto-optical recording medium, and characterized in that the in-plane magnetization layer has a composition satisfying a general formula ($\gamma$1) and a condition ($\gamma$2)

$$Gd_{X3}(Fe_{Y3}Co_{1-Y3})_{1-X3} \quad (\gamma1)$$

$$0.06 \leq X3 \leq 0.13, \text{ or } 0.36 \leq X3 \leq 0.80$$

$$0.80 \leq Y3 \leq 1.00 \quad (\gamma2)$$

In this structure, it is possible to optimize the magnetic properties of the in-plane magnetization layer, and stably decrease the recording magnetic field for the magneto-optical recording medium and magnetically induced super resolution magneto-optical recording medium.

A thirteenth magneto-optical recording medium of the present invention is based on the sixth or eighth magneto-optical recording medium, and satisfies a condition (B)

$$Tc3-160° C. \leq Tc12 \leq Tc3-60° C. \quad (B)$$

where Tc3 is the Curie temperature of the auxiliary recording layer, and Tc12 is the Curie temperature of the in-plane magnetization layer.

In this structure, it is possible to optimize the relationship between the Curie temperature of the auxiliary recording layer and the Curie temperature of the in-plane magnetization layer, and stably decrease the recording magnetic field for the magneto-optical recording medium and magnetically induced super resolution magneto-optical recording medium.

A first magneto-optical recording method of the present invention is based on a method of recording information on a recording layer by applying a light beam to a magneto-optical recording medium having at least the recording layer and an auxiliary recording layer which achieves magnetostatic coupling with the recording layer and by applying an external magnetic field thereto, and characterized in aligning the magnetization direction of the auxiliary recording layer with the direction of the external magnetic field, and aligning the magnetization of the recording layer with the direction of the external magnetic field by a total magnetic field of a leakage magnetic field from the auxiliary recording layer and the external magnetic field.

In this method, since the information is recorded on the magneto-optical recording medium by the total magnetic field produced by adding the leakage magnetic field from the auxiliary recording layer to the external magnetic field, it is possible to decrease the external magnetic field to be applied.

A second magneto-optical recording method of the present invention is based on the first magneto-optical recording method, and characterized in bringing a portion of the auxiliary recording layer where the magnetization direction is not aligned with the direction of the external magnetic field into the in-plane magnetization state.

In this method, it is possible to easily align the magnetization direction of the auxiliary recording layer with the direction of the external magnetic field, and realize recording at a lower magnetic field strength.

Furthermore, a first magneto-optical recording apparatus of the present invention is based on a magneto-optical recording apparatus having at least heating means for heating a recording region to a temperature not lower than a recording temperature by applying a light beam to a magneto-optical recording medium having at least a recording layer and an auxiliary recording layer which achieves magnetostatic coupling with the recording layer, and characterized in including external magnetic field applying means for applying to portions of the recording layer and auxiliary recording layer corresponding to the recording region an external magnetic field Mg satisfying the relationship $$Mh \leq Mg < Mr$$

where Mr is an applied magnetic field required for aligning the magnetization direction in a portion of the recording layer heated to a temperature not lower than the recording temperature with the direction of the external magnetic field when the recording layer is present alone, and Mh is an applied magnetic field required for aligning the magnetization direction in a portion of the auxiliary recording layer heated to a temperature not lower than the recording temperature with the direction of the external magnetic field.

In this structure, since the external magnetic field to be applied is small, it is possible to achieve a reduction in the size of the apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:
   a recording layer on which information is recorded by heating said recording layer to a temperature not lower than a recording temperature in a vicinity of a Curie temperature thereof and applying an external magnetic field thereto; and
   an auxiliary recording layer which achieves magnetostatic coupling with said recording layer and is in an in-plane magnetization state at a temperature lower than the recording temperature, and in a perpendicular magnetization state at temperatures not lower than the recording temperature.

2. The magneto-optical recording medium as set forth in claim 1, further comprising a readout layer which achieves magnetostatic coupling with said recording layer, and is in an in-plane magnetization state at room temperature, and in a perpendicular magnetization state in a temperature range near a readout temperature.

3. The magneto-optical recording medium as set forth in claim 1, further comprising an in-plane magnetization layer which has a Curie temperature near the recording temperature, and achieves exchange coupling with said auxiliary recording layer.

4. The magneto-optical recording medium as set forth in claim 1, further comprising a writing layer whose magnetization is switched at a magnetic field strength lower than a magnetic field strength required for switching a magnetization of said recording layer in a temperature range near the recording temperature.

5. The magneto-optical recording medium as set forth in claim 1, further comprising a first non-magnetic intermediate layer and a protective layer,
   wherein said recording layer, said first non-magnetic intermediate layer, said auxiliary recording layer, and said protective layer are deposited in this order,
   a thickness of said recording layer is within a range of from 10 nm to 80 nm,
   a thickness of said first non-magnetic intermediate layer is within a range of from 1 nm to 80 nm, and
   a thickness of said auxiliary recording layer is within a range of from 110 nm to 200 nm.

6. The magneto-optical recording medium as set forth in claim 3, further comprising a first non-magnetic intermediate layer and a protective layer,
   wherein said recording layer, said first non-magnetic intermediate layer, said auxiliary recording layer, said in-plane magnetization layer, and said protective layer are deposited in this order,
   a thickness of said recording layer is within a range of from 10 nm to 80 nm,
   a thickness of said first non-magnetic intermediate layer is within a range of from 1 nm to 80 nm,
   a thickness of said auxiliary recording layer is within a range of from 10 nm to 120 nm, and
   a thickness of said in-plane magnetization layer is within a range of from 5 nm to 150 nm.

7. The magneto-optical recording medium as set forth in claim 4, further comprising a first non-magnetic intermediate layer and a protective layer,
   wherein said recording layer, said writing layer, said first non-magnetic intermediate layer, said auxiliary recording layer, and said protective layer are deposited in this order,
   a thickness of said recording layer is within a range of from 10 nm to 80 nm,
   a thickness of said writing layer is within a range of from 5 nm to 80 nm,
   a thickness of said first non-magnetic intermediate layer is within a range of from 1 nm to 80 nm, and
   a thickness of said auxiliary recording layer is within a range of from 10 nm to 200 nm.

8. The magneto-optical recording medium as set forth in claim 1, further comprising:
   an in-plane magnetization layer which has a Curie temperature near the recording temperature, and achieves exchange coupling with said auxiliary recording layer; and
   a writing layer which achieves exchange coupling with said recording layer, and switches a magnetization thereof at a magnetic field strength lower than a magnetic field strength required for switching a magnetization of said recording layer, in a temperature range near the recording temperature, wherein said recording layer, said writing layer, said first non-magnetic intermediate layer, said auxiliary recording layer, said in-plane magnetization layer, and said protective layer are deposited in this order, a thickness of said recording layer is within a range of from 10 nm to 80 nm, a thickness of said writing layer is within a range of from 5 nm to 80 nm, a thickness of said first non-magnetic intermediate layer is within a range of from 1 nm to 80 nm, a thickness of said auxiliary recording layer is within a range of from 10 nm to 120 nm, and a thickness of said in-plane magnetization layer is within a range of from 5 nm to 150 nm.

9. The magneto-optical recording medium as set forth in claim 5, wherein said auxiliary recording layer has a composition satisfying a general formula (α1) and a condition (α2)

$$Gd_{X1}(Fe_{Y1}Co_{1-Y1})_{1-X1} \quad (\alpha 1)$$

$$0.29 \leq X1 \leq 0.33$$

$$0.60 \leq Y1 \leq 0.80 \quad (\alpha 2).$$

10. The magneto-optical recording medium as set forth in claim 5, wherein said recording layer and said auxiliary recording layer satisfy a condition (A)

$$Tc1-120° C. \leq Tp \leq Tc1 \quad (A)$$

where Tc1 is a Curie temperature of said recording layer, and Tp is a temperature at which said auxiliary recording layer changes into the perpendicular magnetization state.

11. The magneto-optical recording medium as set forth in claim 6, wherein said auxiliary recording layer has a composition satisfying a general formula (β1) and a condition (β2)

$$Gd_{X2}(Fe_{Y2}Co_{1-Y2})_{1-X2} \quad (\beta 1)$$

$$0.22 \leq X2 \leq 0.33$$

$$0.60 \leq Y2 \leq 0.85 \quad (\beta 2).$$

12. The magneto-optical recording medium as set forth in claim 6, wherein said in-plane magnetization layer has a composition satisfying a general formula (γ1) and a condition (γ2)

$$Gd_{X3}(Fe_{Y3}Co_{1-Y3})_{1-X3} \quad (\gamma 1)$$

$$0.06 \leq X3 \leq 0.13, \text{ or } 0.36 \leq X3 \leq 0.80$$

$$0.80 \leq Y3 \leq 1.00 \quad (\gamma 2).$$

13. The magneto-optical recording medium as set forth in claim 6, wherein said auxiliary recording layer and said in-plane magnetization layer satisfy a condition (B)

$$Tc3-160° C. \leq Tc12 \leq Tc3-60° C. \quad (B)$$

where Tc3 is a Curie temperature of said auxiliary recording layer, and Tc12 is the Curie temperature of said in-plane magnetization layer.

14. The magneto-optical recording medium as set forth in claim 7, wherein said auxiliary recording layer has a composition satisfying a general formula (α1) and a condition (α2)

$$Gd_{X1}(Fe_{Y1}Co_{1-Y1})_{1-X1} \quad (\alpha 1)$$

$$0.29 \leq X1 \leq 0.33$$

$$0.60 \leq Y1 \leq 0.80 \quad (\alpha 2).$$

15. The magneto-optical recording medium as set forth in claim 7, wherein said recording layer and said auxiliary recording layer satisfy a condition (A)

$$Tc1-120° C. \leq Tp \leq Tc1 \quad (A)$$

where Tc1 is a Curie temperature of said recording layer, and Tp is a temperature at which said auxiliary recording layer changes into the perpendicular magnetization state.

16. The magneto-optical recording medium as set forth in claim 7, wherein said writing layer has a composition satisfying a general formula (δ1) and a condition (δ2)

$$Gd_{X4}(Fe_{Y4}Co_{1-Y4})_{1-X4} \quad (\delta 1)$$

$$0.19 \leq X4 \leq 0.27$$

$$0.60 \leq Y4 \leq 0.80 \quad (\delta 2).$$

17. The magneto-optical recording medium as set forth in claim 8, wherein said auxiliary recording layer has a composition satisfying a general formula (β1) and a condition (β2)

$$Gd_{X2}(Fe_{Y2}Co_{1-Y2})_{1-X2} \quad (\beta 1)$$

$$0.22 \leq X2 \leq 0.33$$

$$0.60 \leq Y2 \leq 0.85 \quad (\beta 2).$$

18. The magneto-optical recording medium as set forth in claim 8, wherein said in-plane magnetization layer has a composition satisfying a general formula (γ1) and a condition (γ2)

$$Gd_{X3}(Fe_{Y3}Co_{1-Y3})_{1-X3} \quad (\gamma 1)$$

$$0.06 \leq X3 \leq 0.13, \text{ or } 0.36 \leq X3 \leq 0.80$$

$$0.80 \leq Y3 \leq 1.00 \quad (\gamma 2).$$

19. The magneto-optical recording medium as set forth in claim 8, wherein said auxiliary recording layer and said in-plane magnetization layer satisfy a condition (B)

$$Tc3-160° C. \leq Tc12 \leq Tc3-60° C. \quad (B)$$

where Tc3 is a Curie temperature of said auxiliary recording layer, and Tc12 is the Curie temperature of said in-plane magnetization layer.

20. A magneto-optical recording method for recording information on a recording layer of a magneto-optical recording medium including said recording layer and an auxiliary recording layer which achieves magnetostatic coupling with said recording layer, the magneto-optical recording method comprising the steps of:

applying a light beam to said magneto-optical recording medium;

applying an external magnetic field to a portion of said magneto-optical recording medium heated to a recording temperature in the vicinity of a Curie temperature of said recording layer by application of the light beam so as to align a magnetization direction of said auxiliary recording layer at that portion with a direction of the external magnetic field;

aligning a magnetization direction of said recording layer with the direction of the external magnetic field by a total magnetic field produced by adding a leakage magnetic field from said auxiliary recording layer and the external magnetic field together; and giving said auxiliary recording layer an in-plane magnetization state in portions thereof not heated to the recording temperature, whose magnetization direction is not aligned with the direction of the external magnetic field.

21. The magneto-optical recording medium as set forth in claim 1;

wherein, at the recording temperature, a direction of magnetization of said auxiliary recording layer is aligned with a direction of the external magnetic field, and the magnetization of said auxiliary recording layer is copied to said recording layer, thereby assisting recording of information; and where an externally-applied magnetic field strength Mh, required for aligning the magnetization direction of the auxiliary recording layer at the recording temperature, is smaller than an externally-applied magnetic field strength Mr, required, when said recording layer is present alone, for aligning the magnetization direction of the recording layer at the recording temperature.

* * * * *